(12) United States Patent
Hariprasad

(10) Patent No.: US 10,438,001 B1
(45) Date of Patent: Oct. 8, 2019

(54) IDENTIFICATION, PREDICTION, AND ASSESSMENT OF CYBER SECURITY RISK

(71) Applicant: Arceo Labs Inc., San Francisco, CA (US)

(72) Inventor: Vishaal Hariprasad, San Francisco, CA (US)

(73) Assignee: Arceo Labs Inc., San Francisco, CA (US)

( * ) Notice: Subject to any disclaimer, the term of this patent is extended or adjusted under 35 U.S.C. 154(b) by 0 days.

(21) Appl. No.: 16/236,956

(22) Filed: Dec. 31, 2018

(51) Int. Cl.
*G06F 21/57* (2013.01)
*G06N 5/02* (2006.01)

(52) U.S. Cl.
CPC ............ *G06F 21/577* (2013.01); *G06N 5/02* (2013.01); *G06F 2221/034* (2013.01)

(58) Field of Classification Search
CPC . H04L 63/1433; H04L 63/20; H04L 63/1416; H04L 63/1408; H04L 63/10; H04L 63/105; H04L 63/1441; H04L 63/14; H04L 2463/102; H04L 43/045; G06Q 40/08; G06Q 10/0635; G06Q 10/06393; G06Q 30/0202; G06F 21/577
See application file for complete search history.

*Primary Examiner* — Brian F Shaw
(74) *Attorney, Agent, or Firm* — Van Pelt, Yi & James LLP

(57) ABSTRACT

A technique for assessing and quantifying a cyber security risk is provided that includes a cyber resilience platform for obtaining reliable data from a vast set of available metrics, standardizing the data, and extracting meaning from the data to inform cyber security decisions. The disclosed technique provides visibility of a dynamic cyberspace landscape by identifying key factors that impact types of cyber security risk. These key factors can be used to distinguish between users of different risk types for various cyber threats and to identify actions affecting loss probabilities associated with a cyber threat. Strengths and weaknesses in a customer's cyber security profile are identified, including configuration settings that impact the effectiveness of cyber security protection measures and a cyber security score indicative of the customer's risk exposure.

20 Claims, 8 Drawing Sheets

IDENTIFICATION, PREDICTION, AND ASSESSMENT OF CYBER SECURITY RISK

BACKGROUND OF THE INVENTION

Insurance relies on an ability to obtain sound actuarial data against an essentially static background of risk. The advent of the Internet and online business practices has generated a demand for cyber-insurance as businesses and individuals seek protection against cyber threats.

Existing technology infrastructure and services currently offered on computer networks are vulnerable to a wide variety of risks posed by a number of cyber threats. These threats include cyber security data and privacy breach, cyber security property damage, data and software loss, cyber extortion, distributed denial of service attacks, and various other intrusions (e.g., hacking, phishing, viruses, spam attacks etc.). As a countermeasure against the risks posed by these cyber threats, network users often depend on cyber security programs and systems including firewalls, antivirus and anti-spam software, intrusion-detection systems (IDSs), and other measures designed to reduce the likelihood of being adversely affected by cyber threats. Current efforts focus on developing and deploying tools to detect cyber threats in order to protect the cyber infrastructure and its users from the resulting negative impact of these threats.

However, in spite of improvements in risk protection resulting from advances in hardware, software, and cryptographic methodologies, providing and being able to obtain adequate and affordable coverage from cyber insurance poses a technical challenge not currently addressed by a sound technical solution. The traditional insurance framework that depends on access to sound actuarial data against a largely static risk backdrop fails when applied to the current cyber space environment. In this dynamic environment and in the absence of sound actuarial data, companies lack the ability to identify, predict, and assess the cyber security risk posed by cyber threats. The lack of visibility into the factors and parameters that impact types of cyber security risk leads to an inability to distinguish between users of different risk types (e.g., high risk versus low risk users) for different cyber threats, and an inability to effectively manage users undertaking actions that adversely affect loss probabilities after an insurance contract has been signed. The lack of understanding of the factors and parameters that impact types of cyber security risk and inability to identify actions that raise or mitigate cyber security risk also impacts a would-be insurer's ability to offer appropriate coverage against a given cyber security risk posed by a cyber threat. Prospective cyber-insurance companies are therefore hesitant to enter a market where they are unable to understand and keep up with the dynamic and constantly changing cyber space landscape. As a result, the market for cyber-insurance is unable to thrive, businesses and individuals are unable to obtain the coverage against cyber threats that they desire, and cyber coverage that is offered is not catered to a particular insurance customer's cyber security profile but is instead, tightly limited to decrease the risk to underwriters.

BRIEF DESCRIPTION OF THE DRAWINGS

Various embodiments of the invention are disclosed in the following detailed description and the accompanying drawings.

DETAILED DESCRIPTION

Figure 1:
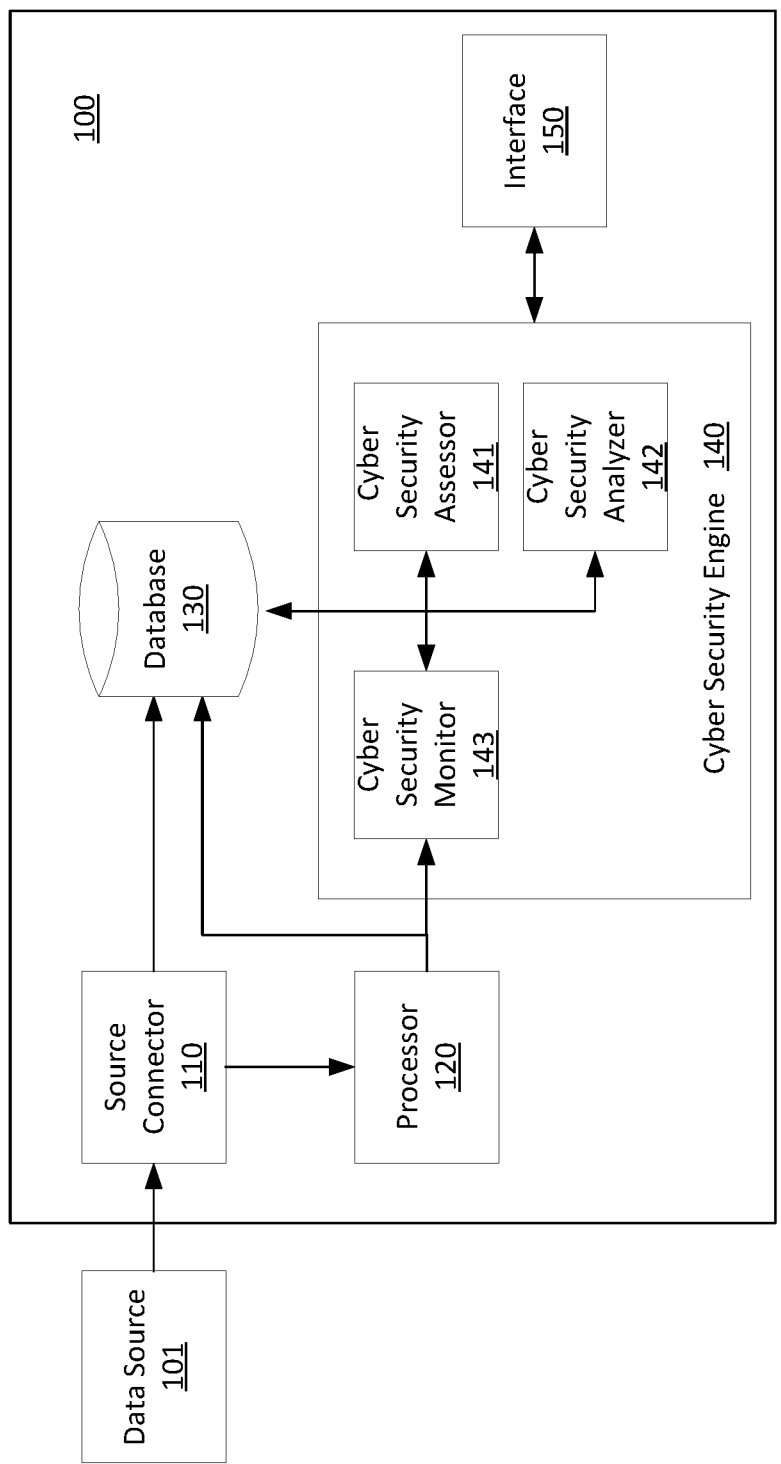
FIG. 1 illustrates an exemplary embodiment of a cyber resilience platform for assessing and quantifying a cyber security risk.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The advent of the Internet and online business practices accompanied with a wide-spread use of information technology to do business has created a need for improving the state of cyber security and in particular, for reducing cyber threats and increasing resilience against them. In this environment, cyber insurance has emerged as a potential tool for effective risk management in cyberspace.

In practice, however, a number of barriers prevent the market for cyber-insurance from thriving and achieving maturity. Insurance relies on an ability to obtain sound actuarial data against an essentially static background of risk. But the nature of cyber space is dynamic and constantly changing. Thus, while a large volume of data related to cyber networks and Internet use is available from various data sources, the raw metrics being collected are not standardized and often the same metric or measurement will vary across different data sources or data providers. Moreover, the sheer volume of available data coupled with the dynamic and constantly changing cyber space environment from which the data is obtained overwhelms existing systems which fail to identify and provide an understanding of the key factors and parameters that actually impact types of cyber security risk and to determine actionable cyber security measures that either raise or mitigate the various types of cyber security risk.

Despite the availability of vast amounts of raw data related to cyber networks, the paucity of data relating to actual damage correlated with a cyber risk event coupled with a lack of standards associated with the classification of cyber risk events and a lack of evidence associated with the efficacy of industry best practices creates a technical problem not addressed by existing techniques.

In particular, the technical challenge of how to identify, assess, and quantify risk in order to effectively manage risk in current cyber networks arises in part due to fundamental properties of information technology. In a large distributed system such as the Internet, risks span a large set of nodes in the network and are correlated. For example, user investments to take certain cyber security measures or cyber security solutions can positively impact other users in the network and influence whether they choose to make similar investments. In contrast, in traditional insurance scenarios, the risk span is more limited and uncorrelated. Thus, the technical challenge to overcome due to the interdependent and correlated nature of cyber security risks is particular to the cyber insurance industry.

In addition to the technical problem of obtaining reliable actuarial data needed to compute insurance premiums from the vast set of available metrics, prospective insurers must also determine how to extract meaning and value from large volumes of raw data to understand what actually impacts different types of cyber security risk posed by various cyber threats in a dynamic and constantly changing cyber space environment. To effectively manage cyber security risk requires being able to identify key factors and parameters that impact types of cyber security risk—an ability that is currently lacking in existing systems. This lack of visibility in existing systems as to what impacts cyber security risk means that decision makers among the prospective insurers, underwriters, and insurance customers share a lack of awareness and uncertainty that adversely impacts the cyber insurance market. Insurers are unable to determine and price appropriate insurance coverage against different types of cyber security risk and to establish an acceptable risk for a particular organization or individual. Businesses and individuals are unable to obtain the coverage against cyber threats that they desire. Moreover, cyber coverage that is offered is not catered to a particular insurance customer's cyber security profile but is instead, tightly limited to decrease the risk to underwriters.

To address the technical challenges in risk management for cyber networks as described above, a technique is disclosed that provides a technical solution for cyber risk management by identifying and quantifying a cyber security risk. In particular, the disclosed technique includes a cyber resilience platform for obtaining actuarial data from a vast set of available metrics, standardizing the data through normalization, and extracting meaning and value from the data through a process of aggregating, evaluating, weighting, scoring, and benchmarking various metrics. In some cases, the cyber resilience platform is used to provide a desired level of details and results based on this process and by referencing a cyber security infograph. The cyber security infograph is configured to capture relationships between metrics and categorizations of data including key factors to inform cyber security and cyber insurance coverage decisions. In this manner, the cyber resilience platform is configured to distill large volumes of different types of security data into a finite, meaningful subset of key factors that most impact a particular cyber security risk, presenting the key factors in a usable form that is tied to a specific type of coverage. By constantly and continuously monitoring key factors identified to have the most impact on a particular cyber security risk, the cyber resilience platform provides increased visibility of the cyber threats in a particular customer's cyber security profile with respect to the changing cyberspace landscape.

The cyber resilience platform thus provides an ability to detect and see a particular cyber security risk and to identify and assess key factors and parameters such as metrics and observations that impact various types of cyber security risk. Moreover, the cyber resilience platform generates a cyber security assessment that quantifies a particular cyber security risk through a cyber security score determined based at least in part on a weighted combination of individual metric scores corresponding to metrics identified as impacting the particular cyber security risk. Weights for individual metric scores are adjusted in response to real-time feedback using security data that includes claims and incidents data for improved prediction of the cyber security score.

The key factors identified by the cyber resilience platform can be used to distinguish between users of different risk types (e.g., high risk versus low risk users) for different cyber threats and to identify and recommend actions that affect loss probabilities associated with a cyber threat. In particular, the cyber resilience platform identifies strengths and weaknesses in an insurance customer's cyber security profile, including specific configuration settings that impact the effectiveness of the customer's cyber security protection system. As a result, the cyber resilience platform provides an ability to determine actions for an insurance customer that can raise or mitigate that customer's cyber security risk and that impact the decision regarding an appropriate coverage for the customer against a given cyber security risk posed by a cyber threat.

The insight into the various types of cyber security risk for a given customer provided by the cyber resilience platform, and in particular, the identification of what matters in a customer's current cyber security configuration settings, enables the customer to take actions to reconfigure and protect itself against a given cyber security threat detected and identified by the platform. To better enhance understanding of the cyber security assessment, security data based on internal and external threat intelligence is made available in human readable form via vignettes that provide a story or meaningful description of the cyber security assessment and key factors. The cyber resilience platform also provides an ability to detect a trigger or loss event that leads to a claim and to determine a likelihood of a loss event occurring based at least in part on a severity and a frequency associated with a loss event. Here, severity is a measure of an actual loss resulting as a consequence of a breach due to a loss event occurring, while frequency is a measure of how often the loss event occurs. The cyber resilience platform is configured to process metrics obtained from various data sources including open source threads and telefeeds that provide indicators of compromise extracted from an external threat environment and to detect incidences that are occurring in real time and create a feedback loop to a configuration of parameters in response to the detected incidences.

In some embodiments, a cyber resilience platform for assessing and quantifying a cyber security risk comprises a cyber security infograph comprising a plurality of nodes and edges. Each node represents an entity in a data ontology and an edge connecting one node to another node in the plurality of nodes represents a relationship between the two entities corresponding to the nodes connected by the edge. In some instances, the entities in the data ontology include metrics, observations, features, controls, and triggers, each trigger being associated with a cyber security risk. In some cases, as described herein, the entities in the data ontology also include vignettes.

In some embodiments, the cyber resilience platform also includes: a source connector configured to connect to a data source and to obtain metrics from the data source; a cyber security assessor configured to provide a cyber security assessment associated with a particular cyber security risk, wherein the cyber security assessment includes an identification of configuration settings corresponding to key metrics that inform key entities having an impact on a trigger associated with the cyber security risk, wherein the key metrics and key entities are determined based at least in part on referencing the cyber security infograph; a cyber security analyzer configured to determine a cyber security score associated with the particular cyber security risk based at least in part on a weighted combination of individual metric scores corresponding to the key metrics; and a cyber security monitor configured to monitor and receive data from the data source and to adjust a weight on an edge in the cyber security infograph based at least in part on the monitored or received data.

In some embodiments, a method for assessing and quantifying a cyber security risk comprises: connecting to a data source, obtaining metrics from the data source, and providing a cyber security assessment associated with a particular cyber security risk based at least in part on the metrics obtained from the data source. In some cases, the cyber security assessment is provided by referencing a cyber security infograph to identify key metrics that inform key entities having an impact on a trigger associated with the particular cyber security risk. In this case, the cyber security infograph comprises a plurality of nodes and edges, wherein each node represents an entity in a data ontology and an edge connecting one node to another node in the plurality of nodes represents a relationship between the two entities corresponding to the nodes connected by the edge, and wherein the entities in the data ontology include metrics, observations, features, controls, and triggers, each trigger being associated with a cyber security risk. In some cases, as described herein, the entities in the data ontology also include vignettes. Providing a cyber security assessment further comprises identifying configuration settings corresponding to the key metrics that inform the key entities.

In some examples, the method also includes determining a cyber security score associated with the particular cyber security risk based at least in part on a weighted combination of individual metric scores, wherein each individual metric score corresponds to one of the key metrics. Finally, the method includes monitoring and receiving data from the data source and adjusting a weight on an edge in the cyber security infograph based at least in part on the monitored or received data.

FIG. 1 illustrates an exemplary embodiment of a cyber resilience platform 100 for assessing and quantifying a cyber security risk. The cyber resilience platform 100 includes a cyber security infograph (depicted in FIGS. 3A-3C) comprising a plurality of nodes and edges. Each node represents an entity in a data ontology and an edge connecting one node to another node in the plurality of nodes represents a relationship between the two entities corresponding to the nodes connected by the edge. In this example, and as discussed in further detail below with respect to FIGS. 3A-3C, the entities in the data ontology include metrics, observations, features, controls, and triggers, each trigger being associated with a cyber security risk. In some cases, as described herein, the entities in the data ontology also include vignettes.

At a lowest order of the data ontology (e.g., at the most granular level), metrics comprise raw data collected directly from various security data sources. As an example, metrics include "Number of users," and "Number of MFA enabled users." At a next higher order of the data ontology are observations, which are derived from raw metrics and include meaningful insights aggregated from raw metrics such as, for example, "Percentage of MFA-enabled administrators," and "Administrator to User Ratios." At a next higher order of the data ontology are collections and vignettes. Collections comprise logical groupings of observations for ease of understanding (e.g., "Cloud Access Control," and "Website Functionality"). Vignettes include user facing stories around security data (e.g., "Access Control" and "Asset Management") that provide a more meaningful description of the collections of data (e.g., collections of metrics and observations). At a next higher order of the data ontology are features and observations. Features take the level of granularity to a next higher level by mapping metrics, observations, collections and vignettes to IT Control systems (corresponding to data source classification categories). Similarly, controls take the level of granularity to a next higher level by mapping features to IT Control system categories (corresponding to functional classifications).

Moving from metrics and observations to collections and vignettes to features and controls is essentially an exercise in classification or mappings. As described in more detail with respect to an example below, moving from features and controls to vignettes is an exercise in providing a description that makes sense to a user attempting to interpret the data. At an even higher level of the data ontology, triggers represent an end destination associated with types of cyber risk, wherein the mapping of features and controls to triggers provides a method of identifying the key factors that impact a particular type of cyber risk.

As shown in FIG. 1, the cyber resilience platform 100 also includes a source connector (e.g., Source Connector 110) configured to connect to a data source (e.g. Data Source 101) and to obtain metrics from the data source. As discussed in more detail below, in some cases, cyber resilience platform 100 includes a processor (e.g., Processor 120) configured to process raw data such as the raw metrics pulled from the data source. In the example shown, cyber resilience platform 100 includes a database (e.g., Database 130), which is used to store raw or processed data or metrics (e.g., directly via Source Connector 110 or after processing via Processor 120) from Data Source 101 as well as the cyber security infograph. In this particular example, a metric is represented in the cyber security infograph by a metric node associated with the metric (see e.g., FIGS. 3A-3C).

Additionally, cyber resilience platform 100 includes a cyber security assessor (e.g., Cyber Security Assessor 141) configured to provide a cyber security assessment associated with a particular cyber security risk. The cyber security assessment includes an identification of configuration settings corresponding to key metrics that inform key entities having an impact on a trigger associated with the cyber security risk. In addition, the key metrics and key entities are determined based at least in part on referencing the cyber security infograph. In some cases, the cyber security assessment includes identifying one or more actionable items to improve a cyber security score.

In some cases, the impact of one entity on another second entity, wherein each entity is represented by a node in the cyber security infograph, is indicated by a weight on an edge connecting the nodes of the two entities in the cyber security infograph. In some embodiments, providing a cyber security assessment includes referencing a cyber security infograph to identify key metrics that inform key entities having a substantial impact on a trigger associated with the particular cyber security risk. In some cases, an impact of one entity on another entity is determined to be substantial if the weight on the edge is above a certain threshold, which is set depending on the application. For example, in some applications, threshold values include 10%, 20%, 30%, 40%, and 50%, wherein a weight that is equal to or above the threshold value is considered to indicate a substantial impact, and the weight on an edge in this case ranges between 0 and 100%. In other cases, the key entities having a substantial impact on a trigger are identified based on selecting a certain number of entities having the greatest impact (as indicated by the weights on their respective edges linking the nodes of each entity to the trigger node).

As shown in FIG. 1, cyber resilience platform 100 also includes a cyber security analyzer (e.g., Cyber Security Analyzer 142) configured to determine a cyber security score associated with the particular cyber security risk based at least in part on a weighted combination of individual metric scores corresponding to the key metrics, and a cyber security monitor (e.g., Cyber Security Monitor 143) configured to monitor and receive data from the data source (e.g. Data Source 101) and to adjust a weight on an edge in the cyber security infograph based at least in part on the monitored or received data. The process of adjusting a weight is discussed in more detail below with respect to FIGS. 3A-3C.

In the example shown, cyber resilience platform 100 is configured to send processed data or processed metrics to the cyber security monitor (e.g., Cyber Security Monitor 143) directly after processing by Processor 120. In addition or in the alternative, processed data or processed metrics are obtained by the cyber security monitor (e.g., Cyber Security Monitor 143) from the database (e.g., Database 130).

In some cases, the output of Cyber Security Analyzer 142 (e.g., the cyber security score) is stored in Database 130. Similarly, updates, revisions, or additions to the cyber security infograph are saved and stored in Database 130 including the output of Cyber Security Monitor 143 (e.g., an adjustment or updated value for a weight on an edge in the cyber security infograph).

In some instances, cyber resilience platform 100 includes a cyber security engine (e.g., Cyber Security Engine 140) comprising Cyber Security Assessor 141, Cyber Security Analyzer 142, and Cyber Security Monitor 143. In some cases, as shown in the following figure, the data source comprises plurality of data sources.

Finally, cyber resilience platform 100 includes an interface 150 configured to display data and outputs generated by the cyber resilience platform and to provide a mechanism for a user to view and interact with the cyber resilience platform. For example, the interface 150 can be used to view the cyber security infograph including nodes and edges corresponding to various entities, and outputs generated by the cyber security assessor, cyber security analyzer, and cyber security monitor including the cyber security assessment, cyber security score, and monitored data. As another example, stored metrics can be searched or viewed using interface 150 by using their control, feature, or a text description (e.g., a vignette or a story) mapped to or associated with the metric, in addition to higher level IT or insurance mappings.

Figure 2:
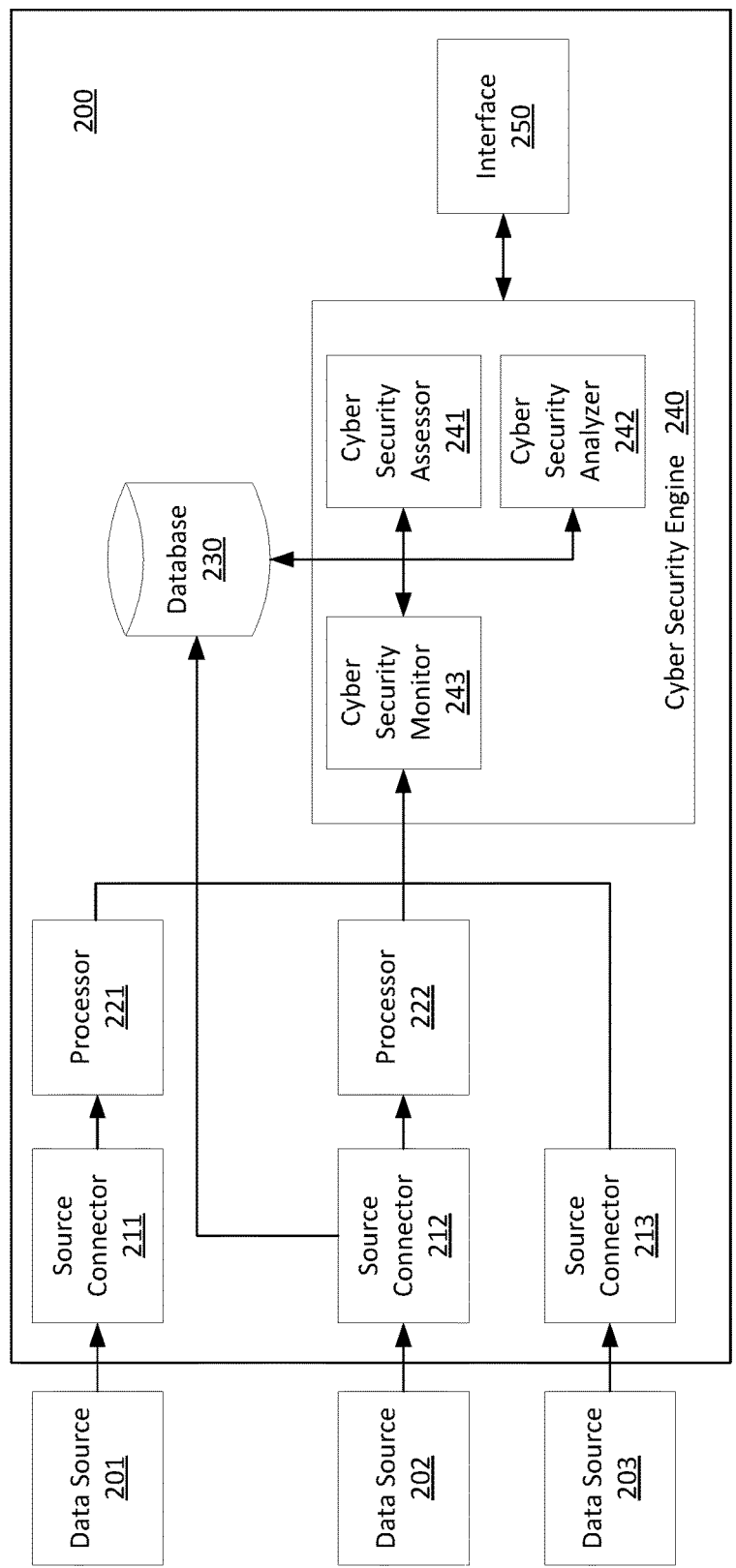
FIG. 2 illustrates an exemplary embodiment of a cyber resilience platform for assessing and quantifying a cyber security risk, wherein the cyber resilience platform is configured to obtain or receive data from a plurality of data sources.

FIG. 2 illustrates an exemplary embodiment of a cyber resilience platform 200 for assessing and quantifying a cyber security risk, wherein the cyber resilience platform is configured to obtain or receive data from a plurality of data sources. Like the previous system described with respect to FIG. 1, the system 200 of FIG. 2 includes a cyber security infograph (depicted in FIGS. 3A-3C) comprising a plurality of nodes and edges. Each node represents an entity in a data ontology and an edge connecting one node to another node in the plurality of nodes represents a relationship between the two entities corresponding to the nodes connected by the edge. In this example, and as discussed in further detail below with respect to FIGS. 3A-3C, the entities in the data ontology include metrics, observations, features, controls, and triggers, each trigger being associated with a cyber security risk. In some cases, as described herein, the entities in the data ontology also include vignettes.

As shown in FIG. 2, cyber resilience platform 200 also includes a plurality of source connectors (e.g., Source Connector 211, Source Connector 212, and Source Connector 213) configured to connect to each data source (e.g. Data Source 201, Data Source 202, and Data Source 203) in the plurality of data sources and to obtain metrics from each of the data sources. In some cases (not shown), a single source connector is configured to connect to and pull data from multiple data sources.

Moreover, as discussed in more detail below, cyber resilience platform 200 is configured to process raw data or raw metrics pulled by a source connector via a processor. In this case, raw data or raw metrics obtained by Source Connector 211 from Data Source 201 are processed by Processor 221 and subsequently stored in Database 230. In some cases, cyber resilience platform 200 is configured to store the raw and processed data or the raw and processed metrics. For example, raw data or raw metrics pulled by Source Connector 212 from Data Source 202 are stored in Database 230 and are also processed by Processor 222 and subsequently stored in Database 230. In other cases, unprocessed data is stored directly after being pulled from a data source. As an example, raw data or raw metrics pulled by Source Connector 213 from Data Source 203 are stored in Database 230 without being processed by a processor. Note that, although FIG. 2 depicts three data sources, the disclosed system is not limited to obtaining data or pulling data from three data sources, but includes obtaining or pulling data from any number of data sources depending on the application. Similarly, the disclosed system can include any number of source connectors for connecting to data sources and can include any number of processors for processing raw data or raw metrics pulled from various data sources.

As described above, cyber resilience platform 200 includes a database (e.g. Database 230), which is used to store data or metrics (e.g., in a raw or processed form) obtained from each data source (e.g. Data Source 201, Data Source 202, and Data Source 203) in the plurality of data sources as well as to store the cyber security infograph. In this particular example, a metric is represented in the cyber security infograph by a metric node associated with the metric (see e.g., FIG. 3A).

As in the example of FIG. 1, cyber resilience platform 200 of FIG. 2 also includes a cyber security assessor (e.g., Cyber Security Assessor 241) configured to provide a cyber security assessment associated with a particular cyber security risk. The cyber security assessment includes an identification of configuration settings corresponding to key metrics that inform key entities having an impact on a trigger associated with the cyber security risk. In addition, the key metrics and key entities are determined based at least in part on referencing the cyber security infograph. In some cases, the cyber security assessment includes identifying one or more actionable items to improve a security cyber security score. In particular, the cyber security assessment identifies increased types of cyber risk and coverage types as well as weaknesses in the customer's cyber security profile in specific areas (e.g., configuration settings defined by certain metrics that inform a feature or a control having an impact on a trigger associated with a particular cyber security risk).

In some cases, the impact of one entity on another second entity, wherein each entity is represented by a node in the cyber security infograph, is indicated by a weight on an edge connecting the nodes of the two entities in the cyber security infograph. In some embodiments, providing a cyber security assessment includes referencing a cyber security infograph to identify key metrics that inform key entities having a substantial impact on a trigger associated with the particular cyber security risk. In some cases, an impact of one entity on another entity is determined to be substantial if the weight on the edge is above a certain threshold, which is set depending on the application. For example, in some applications, threshold values include 10%, 20%, 30%, 40%, and 50%, wherein a weight that is equal to or above the threshold value is considered to indicate a substantial impact, and the weight on an edge in this case ranges between 0 and 100%. In other cases, the key entities having a substantial impact on a trigger are identified based on selecting a certain number of entities having the greatest impact (as indicated by the weights on their respective edges linking the nodes of each entity to the trigger node).

As shown in FIG. 2, cyber resilience platform 200 also includes a cyber security analyzer (e.g., Cyber Security Analyzer 242) configured to determine a cyber security score associated with the particular cyber security risk based at least in part on a weighted combination of individual metric scores corresponding to the key metrics, and a cyber security monitor (e.g., Cyber Security Monitor 243) configured to monitor and receive data from each data source (e.g. Data Source 201, Data Source 202, and Data Source 203) in the plurality of data sources and to adjust a weight on an edge in the cyber security infograph based at least in part on the monitored or received data. The process of adjusting a weight is discussed in more detail below with respect to FIGS. 3A-3C.

In the example shown, cyber resilience platform 200 is configured to send processed data or processed metrics to the cyber security monitor (e.g., Cyber Security Monitor 243) directly after processing by the processors (e.g., Processor 221 and Processor 222). In addition or in the alternative, processed data or processed metrics are obtained by the cyber security monitor (e.g., Cyber Security Monitor 243) from the database (e.g., Database 230).

In some cases, the output of Cyber Security Analyzer 242 (e.g., the cyber security score) is stored in Database 230. Similarly, updates, revisions, or additions to the cyber security infograph are saved and stored in Database 130 including the output of Cyber Security Monitor 243 (e.g., an adjustment or updated value for a weight on an edge in the cyber security infograph).

In some instances, cyber resilience platform 200 includes a cyber security engine (e.g., Cyber Security Engine 240) comprising Cyber Security Assessor 241, Cyber Security Analyzer 242, and Cyber Security Monitor 243.

Finally, cyber resilience platform 200 includes an interface 250 configured to display data and outputs generated by the cyber resilience platform and to provide a mechanism for a user to view and interact with the cyber resilience platform. For example, the interface 250 can be used to view the cyber security infograph including nodes and edges corresponding to various entities, and outputs generated by the cyber security assessor, cyber security analyzer, and cyber security monitor including the cyber security assessment, cyber security score, and monitored data. As another example, stored metrics can be searched or viewed using interface 250 by using their control, feature, or a text description (e.g., a vignette or a story) mapped to or associated with the metric, in addition to higher level IT or insurance mappings.

In some embodiments, the received data (e.g., data or metrics obtained from Data Source 101 of FIG. 1 or from each data source in the plurality of data sources of FIG. 2) includes claims data or incidents data. In these cases, cyber security assessor (e.g., Cyber Security Assessor 141 or Cyber Security Assessor 241) is further configured to determine a severity for an insurable loss based at least in part on the claims data and a frequency for the insurable loss based at least in part on the claims data and the incidents data. Here, the frequency captures how often a breach occurred (e.g., a trigger or a loss event) as reflected in both claims and incidences whereas the severity indicates the consequence of a breach due to a loss event (i.e., the cost or extent of the loss or damage due to a claim). Additionally, the cyber security monitor (e.g., Cyber Security Monitor 143 or Cyber Security Monitor 243) is further configured to adjust the weight on an edge in the cyber security infograph stored in the database (e.g., Database 130 or Database 230) based at least in part on the severity and the frequency.

In some embodiments, the cyber resilience platform (e.g., cyber resilience platform 100 or cyber resilience platform 200) comprises a metric processor (e.g. Processor 120, Processor 221, or Processor 222) configured to normalize a metric obtained from a data source and to determine a benchmark for the normalized metric. In some examples, the metric processor is configured to determine a benchmark for a key metric based at least in part on a baseline model. In some cases, the baseline model is based at least in part on an industry standard. In other cases, the baseline model comprises a predictive model.

As discussed in more detail below, in some cases, the cyber security score is based at least in part on the benchmark. In some instances, the benchmark is initially set based at least in part on an industry standard. In other cases, the benchmark is initially set based at least in part on an industry standard and is subsequently adjusted based on an output of a predictive model. The predictive model is a machine learning model in some cases, which can be trained using data (e.g., security data pulled and processed from various data sources). In some cases, the security data includes data associated with claims and incidences.

In some embodiments, the cyber resilience platform (e.g., cyber resilience platform 100 or cyber resilience platform 200) comprises an aggregator (not shown) configured to map one or more metrics to an observation that provides an aggregated description to a user. In some cases, an aggregator is configured to determine a summary statistic of one or more metrics, for example, an average or a total number of users, depending on the application.

In some cases, data is received by the cyber security monitor on a regular or continual basis, depending on how often the data is updated or available from the data source. In these cases, the cyber security monitor is configured to continuously monitor the data as it becomes available. For example, depending on the application or the data source, data is available or updated on a daily or hourly basis. In some cases, data is available or updated every minute or every second. In these cases, where the availability or updating of data is at a high sampling rate, the data is essentially pulled and processed in real time. The cyber security monitor is configured to adjust the weight on an edge in the cyber security infograph on a regular or continual basis.

As an example, in some cases, source connectors such as APIs are provided by a Source IT product vendor to collect metrics from a data source. Generally, the APIs are configured to be called arbitrarily often, but many are dependent on reports that are updated approximately daily. In some instances, the scheduling interval is configurable and is set depending on the application in order to collect the data as frequently as realistically required by the application without overloading any programs running in production. In some cases, a default is used wherein most APIs are called hourly or daily as deemed appropriate. In this manner, metrics are monitored or collected on a regular basis and as frequently as required (e.g., in real time if appropriate). In the case where the data is available or updated in real time, the data is monitored and received by the cyber security monitor in real time and the cyber security monitor is configured to adjust the weight on an edge in the cyber security infograph in real time. In some cases, the data is pulled or obtained as fast as a source connector (e.g., a Source IT product API) will allow subject to appropriate scalability considerations for all of the components of the overall system. An example of a cyber security infograph will now be described with respect to the following figures.

Figure 3A:
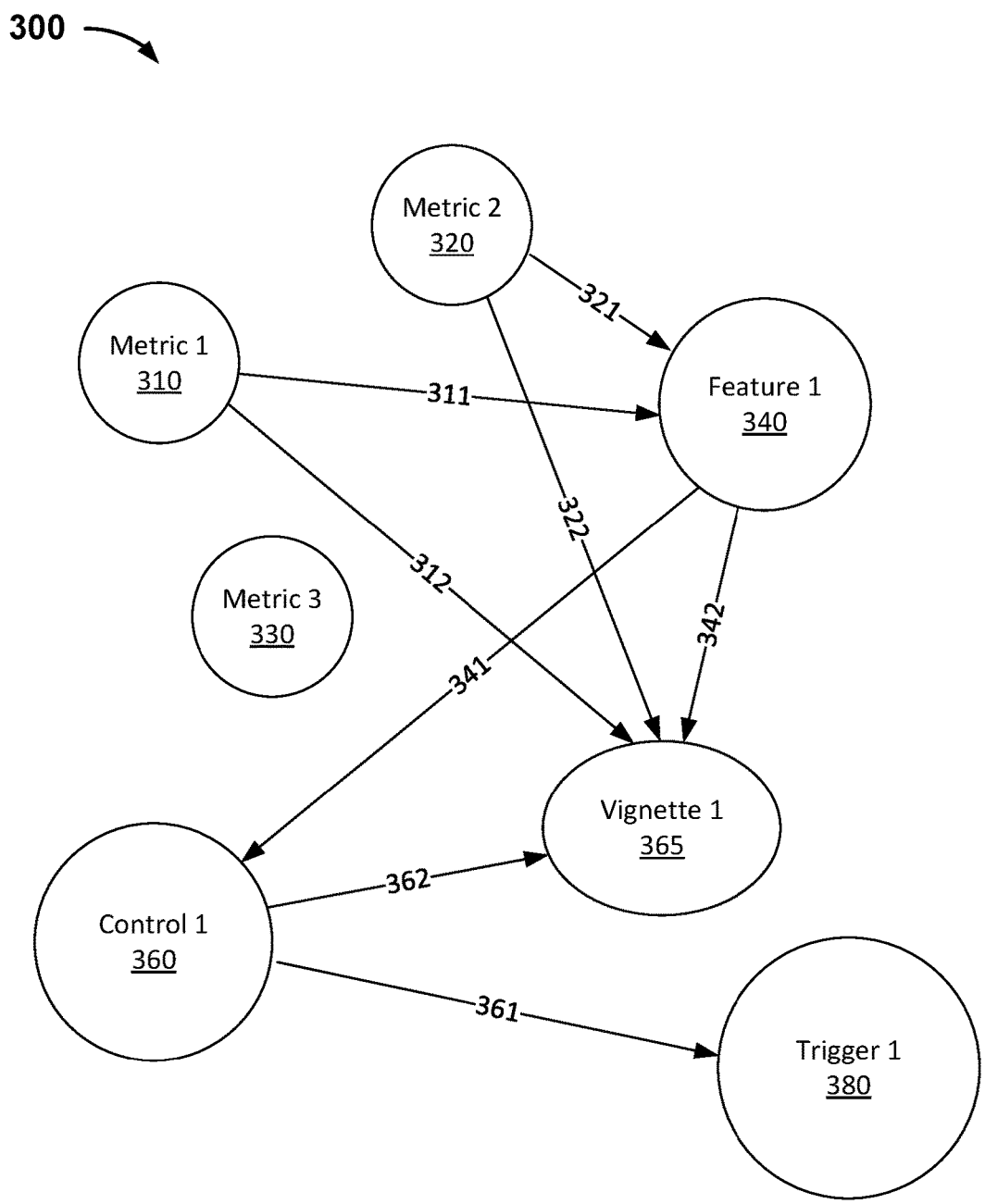
FIG. 3A illustrates an exemplary embodiment of a cyber security infograph.

FIG. 3A illustrates an exemplary embodiment of a cyber security infograph 300. As depicted in FIG. 3A, cyber security infograph 300 comprises a plurality of nodes and edges, wherein each node represents an entity in a data ontology and an edge connecting one node to another node in the plurality of nodes represents a relationship between the two entities corresponding to the nodes connected by the edge. In the example shown, the entities in the data ontology include metrics, observations, features, controls, vignettes, and triggers, wherein each trigger is associated with a cyber security risk. Note that, while this example does not include collections as one of the entities, as described with respect to FIG. 3C, the disclosed technique is flexible and can accommodate other entities by simply adding a node representing the entity in the cyber security infograph and adding edges connecting the additional node to existing nodes to capture relationships between the additional node and existing nodes in the cyber security infograph.

In the example of FIG. 3A, a metric is represented in the cyber security infograph by a metric node (e.g., Metric 1 at 310, Metric 2 at 320, or Metric 3 at 330) associated with a particular metric. In this case, a first metric is represented by Metric 1 at 310, a second metric is represented by Metric 2 at 320, and a third metric is represented by Metric 3 at 330. In a similar manner, a feature is represented in the cyber security infograph by a feature node (e.g., Feature 1 at 340) associated with the feature; a control is represented in the cyber security infograph by a control node (e.g., Control 1 at 360) associated with the control; and a trigger is represented in the cyber security infograph by a trigger node (e.g., Trigger 1 at 380) associated with the Trigger.

As shown in the example of FIG. 3A, an edge connecting one node to another node in the plurality of nodes represents a relationship or a mapping between the two entities represented by the two nodes connected by the edge. For instance, the edge at 311 represents a relationship between a first metric (represented by Metric 1 at 310) and a first feature (represented by Feature 1 at 340) and the edge at 321 represents a relationship between a second metric (represented by Metric 2 at 320) and the first feature (represented by Feature 1 at 340). In this case, the first metric informs the first feature and the second metric informs the second feature. Similarly, the edge at 341 represents a relationship between the first feature (represented by Feature 1 at 340) and a first control (represented by Control 1 at 360). Here, the first feature informs the first control. Finally, the edge at 361 represents a relationship between the first control (represented by Control 1 at 360) and a first trigger (represented by Trigger 1 at 380). In the example shown, the first control informs the first trigger.

Note that a metric can be pulled or obtained from a data source and is represented as a metric node in the cyber security infograph regardless of whether a relationship exists or is determined to exist between the metric and another entity represented by a node in the graph. Here, a third metric (represented by Metric 3 at 330) is not connected or linked to any other nodes in the cyber security infograph but may be connected or linked to a node in the future as additional information regarding relationships between entities corresponding to existing nodes or future nodes are added to the cyber security infograph. In a similar manner, if a relationship is not found between two entities (e.g., a first entity and a second entity), there will be no edge linking the two nodes (e.g., the node associated with the first entity and the node associated with the second entity). Thus, a given feature node may not be connected or linked to any control node or trigger node, and a given control node may not be connected or linked to any trigger node if a relationship is not found between the respective entities represented by each node.

Metrics are raw data collected directly from various security sources and include specific data points exposed by a particular data source. Data sources include software systems or other locations from which data is collected (e.g., Microsoft Office 365, Google G Suite, Insurance Application Form(s), threat feeds, and external scans). In particular, data sources categorized on the type of control they provide and expose metrics. As an example of metrics, Microsoft Office 365 provides "Number of Administrators" and "Number of Administrators with MFA Enabled." Data sources can provide different types of data including security data, insurance data (e.g., actuarial claims and loss data), and company-related data. In some cases, metrics are defined or generated by Source IT products and a determination of which metrics are pulled is based on a particular metric's impact on security, provisioning, or capacity planning of the Source IT product, such that arbitrarily chosen insurance questions posed to an entity can be answered based on the metrics. Accordingly, metrics include a vast array of possibilities, for example, the correct configuration of firewall's rules, the number of machines, users, employees, or administrators in an entity's environment, and whether a system requires MFA (multi-factor authentication). For a typical data source, hundreds to thousands of such metrics are provided and can be pulled or received by the cyber resilience platform as described herein.

Metrics are aggregated to form observations that provide meaningful insights into the data. Observations can also be derived from metrics. Examples of observations include "Percentage of MFA-enabled Administrators" and "Administrator to User Ratios."

Metrics and observations can be tied or mapped to different or multiple features and controls. Features provide an ability for the cyber resilience platform to track the data source and specific metrics that inform the features, distinguishing subsets of given sources. Features include an industry standard list of IT Control systems, such as "Antivirus," "Backups," and "Firewall." Features are primarily related to Gartner/Forrester market segments for IT and IT Security products and other IT solution taxonomies common in the IT industry that typical companies use to protect their infrastructure.

Controls include an industry standard list of IT Control system categories, such as for example, "AAA," "Endpoint," "Cloud," and "Network." These controls describe a high-level IT area to which a particular metric relates. Controls are important, for example to an IT department, in order to evaluate the effectiveness of the cyber security system or set of measures being taken, or to remediate any problems in that system or set of measures. The controls serve to identify categories where a Source IT product requires re-configuration, changes, or improvement in particular to improve the cyber security score and the safety of the environment which the cyber security score represents.

Examples of controls (e.g., IT Control system categories) and features associated with each control (e.g., IT Control systems) are listed in Table 1 below.

TABLE 1

Controls and Features

| Control | Feature |
| --- | --- |
| AAA | AAA |
|  | IAM |
|  | MFA |
|  | SSO |
| Endpoint | Antivirus |
|  | Backups |
|  | Drive Encryption |
|  | EDR |
|  | OS System Settings |
|  | Endpoint Patching |
|  | Virtualization/Containerization |
| Cloud | SaaS |
|  | CDN |
|  | DDoS Prevention |
|  | CASB |
|  | IaaS/PaaS |
| Network | Firewall |
|  | VPN |
|  | Content Filtering |
|  | DLP |

TABLE 1-continued

Controls and Features

| Control | Feature |
| --- | --- |
|  | DNS |
|  | IPAM |
| Physical | Laptop Locks |
|  | USB Port Locks |
|  | Badge Access |
|  | Redundant Cabling |
|  | UPS |
| Management | ITAM/SAM |
|  | Patch Management |
|  | FIM |
|  | SIEM and Log Management |
|  | UBA |
| Assessment | Vulnerability Assessment |
|  | Scanning |
|  | Password Strength Testing |
|  | Web App Security Scanning |
|  | Code Analysis (Static) |
| Organizational | Security Policies |
|  | Incident Response Plans |
|  | Vendor and Employee Checks |
|  | Breach Notification |
|  | Public Relations |
|  | Legal Department |
| Risk | Security Training |
| Awareness | Event Reporting Procedures |
|  | Phishing Simulation |
| OT | HMI |
|  | DCS |
|  | PLC |
|  | RTU |
|  | CNC |
|  | Measurement |
|  | Supervisory Systems |
|  | Production Scheduling |
|  | Safety Systems |

Triggers are types of events that trigger a loss in a given cyber insurance policy. Cyber insurance loss triggers include a common set of triggers are used in many Cyber Insuring Agreements and can also be tuned to a specific situation as needed. Examples of triggers include "Ransomware Attack," "Targeted Cyber Attack," "Data/Privacy Breach Event—First and Third Party," "Internal Programming Error," and "Internal Employee Error." Each trigger is associated with a cyber security risk and is used for evaluating the importance and relative performance of the potentially very large number of possible metrics that could be collected.

Generally, a claim for a covered loss includes a trigger and a coverage type or peril. There are a number of coverage types or perils, each associated with covering losses resulting from various types of cyber security risk, including for example, "Cyber Extortion," "External Cyber Attack," "Breach of Privacy," "Data and Software Loss," and "Business Interruption." For example, a Ransomware Attack Trigger might cause a covered loss resulting in a claim if there is a Cyber Extortion Coverage Insuring Agreement in the underlying cyber insurance policy.

The cyber security infograph provides a construct for converting these very granular metrics in the form of specific data points from Source IT systems into entities that can be used to evaluate controls (e.g., IT Control system categories), triggers, and losses resulting from claims. In particular, the cyber security infograph is configured to capture relationships or mappings between metrics, observations, features, and controls, wherein an edge between two nodes in the cyber security infograph indicates a relationship or mapping between the two nodes. In some cases, a weight is determined and assigned or designated to an edge between two nodes, wherein the weight indicates the degree to which the two nodes are related or how much one node informs the other node to which it is connected.

For instance, returning to FIG. 3A, a first weight can be determined and assigned to the edge at 311 between Metric 1 at 310 and Feature 1 at 340 and a second weight determined and assigned to the edge at 321 between Metric 2 at 320 and Feature 1 at 340.

As an example, suppose the internal metric key for Metric 1 is "Store user documents in OneDrive for Business," for Metric 2, "Enable versioning on all SharePoint online document libraries," and for Feature 1, "Backup." In this example, the cyber security infograph captures a mapping between each of the two metrics (labeled using an internal metric key) and the feature. The cyber resilience platform runs the cyber security monitor, which monitors and receives security data (e.g., data related to claims or incidences) and adjusts the first and second weights to reflect the relative importance of each of the two metrics to the feature.

In this manner, a weight on an edge is adjusted and updated continuously as data is received. Thus, each weight is dynamically adjusted over time in response to security data that is being continuously monitored by the cyber security monitor (e.g., claims or incidences data providing information about severity of loss and frequency of breach) that is pulled or obtained from various data sources. Here, severity is a measure of an actual loss resulting as a consequence of a breach due to a loss event occurring, while frequency is a measure of how often the loss event occurs. Each weight on an edge in the cyber security infograph is a function of both severity and frequency determined from data related to claims and incidences corresponding to a particular trigger which the metric informs. In particular, a given metric is determined to inform a particular trigger if a path exists connecting the edges in the cyber risk infograph from the node representing the given metric to the node representing the particular trigger. Thus, a given metric may inform a particular trigger if the given metric informs a feature that informs the particular trigger or if the given metric informs a control that informs the particular trigger.

In some cases, claim losses result from or can be linked to one or more metrics that are not set to an optimal value. To determine whether a particular metric is set at its optimal value, each metric that is pulled or obtained from a data source is normalized and benchmarked. Typically, the normalization process includes standardizing the metric (e.g., determining whether a particular metric pulled or obtained from a data source that has a certain label corresponds to another metric pulled from a different data source having a different label, wherein a unique internal metric key is used to represent both metrics with a single standard label in the cyber resilience platform) and re-scaling the metric if appropriate so that it may be compared with previously collected data. Thus, after being pulled or obtained from a data source via a source connector, each metric is stored with its metric key. The stored metrics can be searched or viewed by using their control, feature, or a text description mapped to or associated with the metric, in addition to higher level IT or insurance mappings.

In some cases, a higher level IT or insurance mapping is used to provide a high level summary or story of different IT risks to a company, which is based upon weighting, scoring, and benchmarking metrics that are part of that story. In particular, metrics and observations can be mapped into collections or vignettes (e.g., Vignette 1 at 365 of FIGS. 3A-3B), which are logical groups of observations that are presented in a more human readable form for easier understanding to tell the story. These higher level mappings serve to provide a more meaningful description or interpretation of what the data (e.g., values of metrics being collected) represents with respect to understanding its impact on a company's cyber security profile.

Figure 3B:
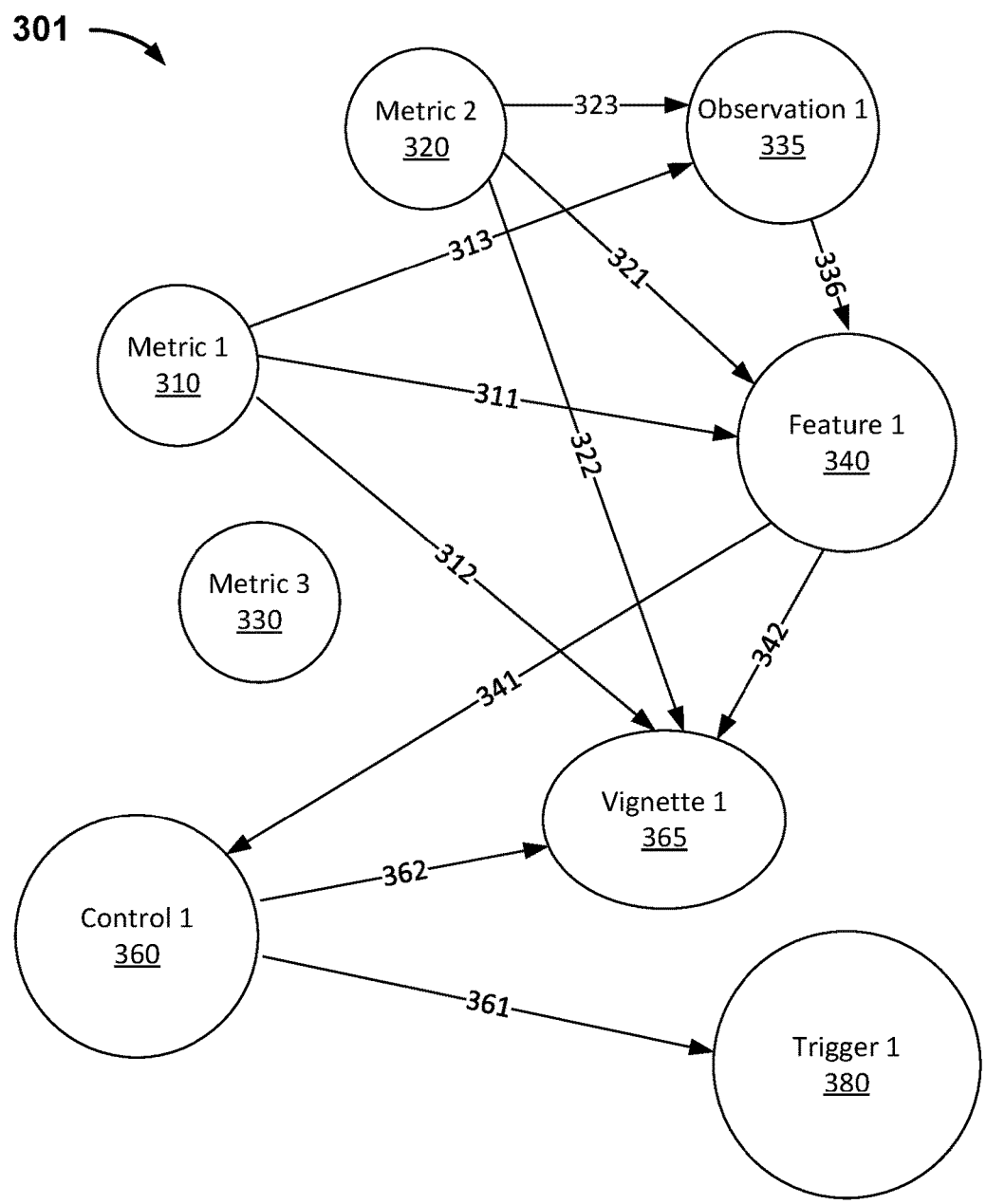
FIG. 3B illustrates an exemplary embodiment of a cyber security infograph that includes an observation node associated with an observation derived or determined based at least in part on one or more metrics.

In the examples depicted in FIGS. 3A and 3B, cyber security infograph 300 and cyber security infograph 301 show that an edge at 312 connects Metric 1 to Vignette 1, an edge at 322 connects Metric 2 to Vignette 1, an edge at 342 connects Feature 1 to Vignette 1, and an edge at 362 connects Control 1 to Vignette 1. Thus, the first metric, second metric, first feature and first control each inform a first vignette (represented by Vignette 1 at 365).

Benchmarking a metric is process for determining whether the metric is set within an optimal range considered to be acceptable for good cyber security hygiene, or whether it falls outside the optimal range and is thus considered to be unacceptable for good cyber security hygiene. The process of benchmarking is used in some cases to take into account the average behavior for other entities that are similar to a given insured (based, for example, on size and market vertical) by establishing a common standard for good cyber security hygiene and best practices as reflected by values of individual metrics. In this case, good cyber security hygiene includes configurations (e.g., IT settings as defined by metrics in a control) that result in fewer losses.

In some instances, a benchmark for a particular metric is set based at least in part on an industry standard. For example, in the case where the particular metric is the Setting of When an Account Password Expires," an industry standard for this metric is "Setting an Account Password to Expire at the Latest Between 90 and 120 Days." In the event that this industry standard is used to establish a benchmark for this metric, if the value of the metric pulled or obtained from the data source for a particular customer meets the benchmark (i.e., the password is set to expire within 120 days), then the metric for that customer is in compliance with the industry standard and falls within the optimal range considered to be acceptable for good cyber security hygiene. On the other hand, if the value of the metric pulled or obtained from the data source fails to meet the benchmark established by the industry standard (i.e., the password is set to expire in more than 120 days, or is not set to expire at all), then the metric for that customer is in not in compliance with the industry standard and falls outside the optimal range considered to be acceptable for good cyber security hygiene.

In some cases, the benchmark is initially set based at least in part on an industry standard and is subsequently adjusted based on an output of a predictive model. The predictive model is a machine learning model in some cases, which can be trained using data (e.g., security data pulled and processed from various data sources). In some cases, the security data includes data associated with claims and incidences.

Continuing the example above, suppose a benchmark for a particular metric is initially set based at least in part on the industry standard that an account password should be set to expire at the latest between 90-120 days. A metric corresponding to the password expiration setting that is pulled from a data source is in compliance with the benchmark as initially set by the industry standard if the value of that metric is that the password is set to expire within 120 days. Now suppose that security data associated with claims or incidences is used to train a predictive model that determines optimal values of metrics to minimize a cost function based on a severity (based on loss data associated with claims) and a frequency (based on the number of breaches that occurred associated with claims and incidences).

The severity in this case is a measure of the consequence of a breach due to a loss event or a loss associated with a claim and the frequency is a measure of how often the trigger occurs based on both claims and incidences. In particular, a claim is mapped to a trigger and a coverage type and thus includes a covered loss, whereas an incidence is an event that is mapped to a trigger wherein a breach has occurred based on the loss event but where no claim was filed and therefore, no loss was incurred. For example, an incidence may result from an event that is unreported as a claim.

In some embodiments, the cost function is a function of a cyber security score, wherein the cyber security score is determined based at least in part on a weighted combination of metrics. In this example, security data is used by the predictive model to determine (based on data associated with claims or incidences) an optimal value or range of values for each metric that minimizes or maximizes the cyber security score (depending on whether a lower or higher cyber security score is associated or correlated with a lower risk) with respect to a given trigger. Here, a predictive model based on data associated with actual claims or incidences may determine that an account password need only be set to expire within 180 days. That is, no adverse effects happen (as reflected by the frequency and severity extracted from data related to incidents and claims) where the password is set to expire within 180 days.

By continuously monitoring and obtaining security data related to claims and incidences and using this security data to adjust the benchmark, the cyber resilience platform is able to adapt to the dynamic and changing cyber space environment to identify key factors (e.g., password expiration settings) that impact a cyber security risk (e.g., a trigger).

Additionally, the cyber resilience platform provides an ability to identify actionable cyber security measures that either raise or mitigate the various types of cyber security risk. For example, a cyber security assessment associated with a cyber security risk (e.g., a trigger) is provided as described herein that includes identifying one or more actionable items to improve a cyber security score (e.g., changing a password expiration setting to meet the benchmark). In some cases, the actionable items are identified as configuration issues in a cyber security assessment, wherein the configuration issues are based on metrics determined not to be meeting their optimal values. Based at least in part on the configuration issues identified in the cyber security assessment, an IT department can choose to address and improve a metric determined not to be meeting its optimal value (e.g., changing a password expiration setting from 200 days to 90 days to meet a benchmark) in order to reduce risk.

In some embodiments, an individual metric score is determined for each metric. In some cases, the individual metric score for a particular metric is based at least in part on the benchmark for that particular metric. In particular, each metric is weighted and benchmarked to ensure an appropriate level of relevance to the cyber security score, which is a weighted combination of individual metric scores.

In some cases, the individual metric score is a binary value, such as an indicator of true or false or a value of 1 or 0. In these cases, a value of "true" or "1" indicates that the metric meets the benchmark and is therefore within an optimal value or range of values considered to be acceptable or to constitute good cyber security hygiene. Conversely, a value of "false" or "0" indicates that the metric does not meet the benchmark and is therefore outside an optimal value or range of values considered to be acceptable or to constitute good cyber security hygiene. Alternatively, the individual metric score for a particular metric can be a value over a continuum, such as a value between 0 and 100, or any other value depending on the metric. Thus, individual metric scores for each metric are flexible and even be computed or determined by a predictive model depending on type of metric and its application.

In some embodiments, the cyber security score is based at least in part on the benchmark for each metric determined to impact a key feature or a key control that in turn impacts a trigger associated with a cyber security risk. In these embodiments, the cyber security score is a weighted combination of the individual metric scores, which as described above, are determined based at least in part on the benchmark for that particular metric. The benchmarking process takes into account how a particular entity or company compares against its peers (e.g., a group of similar entities or companies that share relevant characteristics such as size and industry). The cyber security score can be used as a measure that quantifies a cyber security risk, which can be used in practice to influence pricing or underwriting cyber insurance decisions regarding a specific insured.

Returning to the example of Metric 1 (having an internal metric key of "Store user documents in OneDrive for Business"), Metric 2 (having an internal metric key of "Enable versioning on all SharePoint online document libraries"), and Feature 1 ("Backup"), if the first and second metrics are assigned equal weight (i.e., the edge at 311 and the edge at 321 are assigned equal values), the contribution of each individual metric score to the overall cyber security score will be equal. In this case, suppose that a particular company stores user documents in OneDrive for business, but does not have its versioning of SharePoint enabled on 100% of its document libraries. The value of the first metric pulled from the data source for this particular company meets the benchmark for "Store user documents in OneDrive for Business" resulting in an individual metric score of 100 for the first metric (assuming that a metric score has a value between 0 and 100). However, the second metric corresponding to Metric 2 pulled from the data source for this particular company does not meet the benchmark for "Enable versioning on all SharePoint online document libraries" resulting in an individual metric score of 0 for the second metric. Because the first and second metrics are weighted equally as reflected by the weights on the two edges at 311 and 312 respectively, the cyber security score resulting from a weighted combination of these two metrics with respect to the feature "Backup" is 50 (assuming that a cyber security score has a value between 0 and 100). Additionally, a cyber security assessment would identify "Enable versioning on all SharePoint online document libraries" as a configuration issue, and would also identify this configuration setting as a recommended action for the company to take in order to improve their current cyber security measures and their cyber risk exposure.

Features and controls thus provide a construct for describing cyber security risks simultaneously in terms of insurance categories (e.g., coverage types) and IT Control systems at the same time, because every metric is mapped to both a trigger and a control in the cyber security risk infograph, and triggers are mapped to coverage types based on claims. This is important, for example, if an IT department is asked to help correct or improve upon the result seen for a particular metric, at the same time that a risk department is seeing a higher amount of insurance cyber security risk for a particular trigger. A trigger-focused look at cyber-specific events is implemented by capturing and identifying metrics, features, and controls that inform a trigger. In particular, metrics are identified that correspond to or are associated with configuration settings (e.g., classified into IT Control system categories), which in turn are linked to the cause of a claim occurring and price of a claim occurring.

Features and controls also provide ways of creating vignettes (i.e., meaningful descriptions to enhance a user's understanding) or cyber security risk stories around security products using a higher order of contextualization. At a lowest order of the data ontology (e.g., at the most granular level), metrics are collected and aggregated to generate observations. In this case, observations are one level higher with respect to granularity in the data ontology. Moving from metrics and observations to features and controls is essentially an exercise in classification or mappings, wherein features take the level of granularity to a next higher level by mapping metrics and observations to IT Control systems (corresponding to data source classifications). Similarly, controls take the level of granularity to a next higher level by mapping features to IT Control system categories (corresponding to functional classifications). As described in more detail with respect to an example below, moving from features and controls to vignettes is an exercise in providing a description that makes sense to a user attempting to interpret the data. Finally, triggers represent an end destination associated with types of cyber risk, wherein the mapping of features and controls to triggers provides a method of identifying the key factors that impact a particular type of cyber risk.

Returning to the example of Metric 1 (having an internal metric key of "Store user documents in OneDrive for Business"), Metric 2 (having an internal metric key of "Enable versioning on all SharePoint online document libraries"), and Feature 1 ("Backup"), the cyber security infograph of FIG. 3A shows that the first feature informs the first control ("Endpoint") (see, e.g., Table 1). But these terms—"Endpoint," "Backup," "Enable versioning on all SharePoint online document libraries," and "Store user documents in OneDrive for Business," are not particularly helpful in conveying a meaningful description to a user seeking to interpret the data in terms of a customer cyber security profile. Accordingly, in some cases, another layer of contextualization is added through the creation of a vignette (e.g., Vignette 1 at 365 of FIG. 3A) from features and controls. In this case, the vignette informed by Feature 1 and Control 1 is "Backup and Disaster Preparedness," and the story associated with the vignette is "An organization's use of Office 365's storage, versioning, and auditing of data recording practices."

Note that features and controls can inform and be mapped to more than one trigger. Although not shown in the cyber risk infograph of FIG. 3A, in the example above, Feature 1 ("Backup") and Control 1 ("Endpoint") inform three different coverage types associated with different triggers—"Liability—Technology Errors and Omissions—Third Party," "Data/Privacy Breach Event—First and Third Party," and "Financial Theft and Fraud—First Party."

Figure 4:
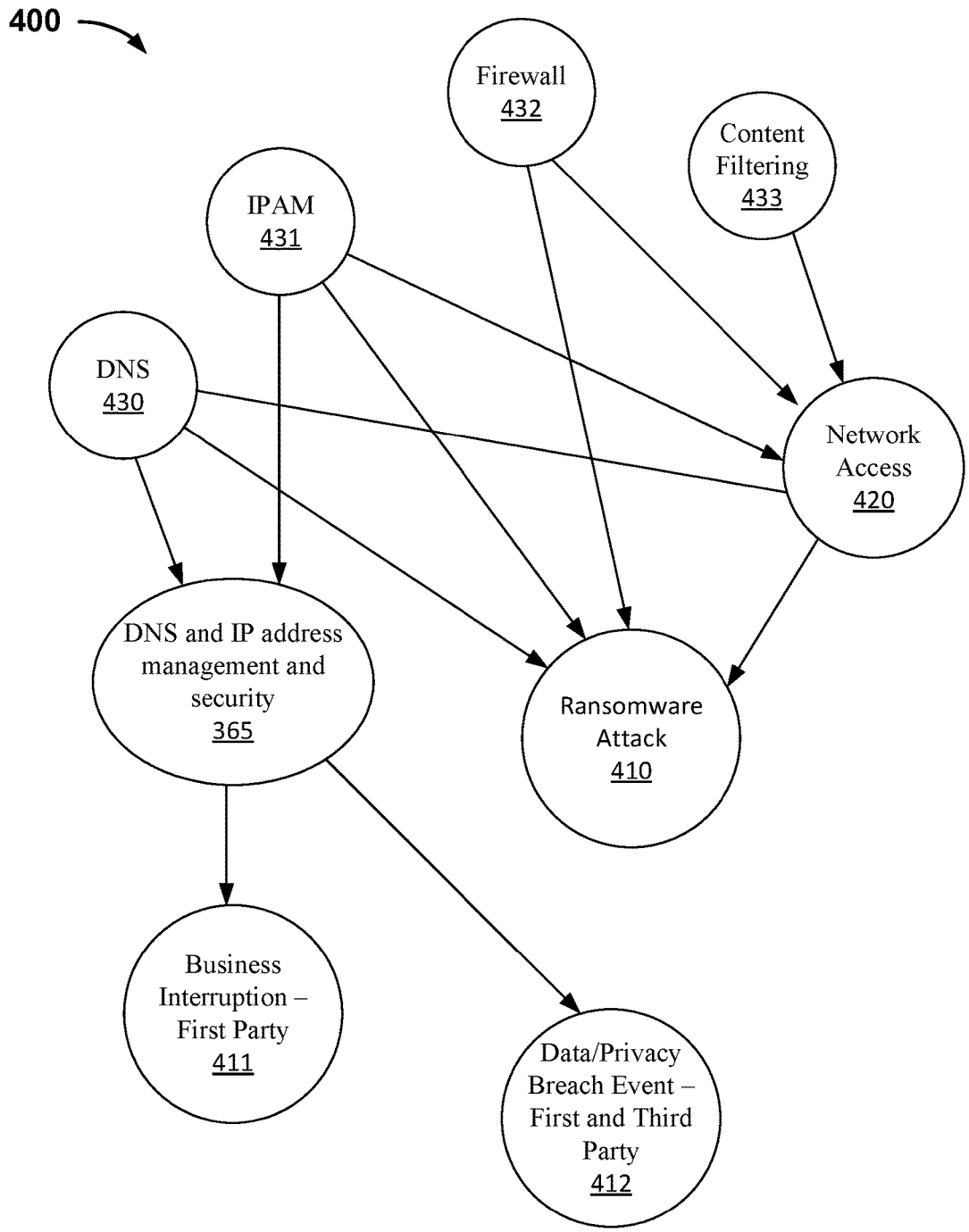
FIG. 4 depicts an embodiment of a cyber security infograph configured to capture relationships between the key metrics, features, and controls that inform the Ransomware Attack trigger associated with the Cyber Extortion coverage type.

As another example starting with the top of the data ontology and focusing on the end destination of triggers and coverage types, suppose that the trigger is "Ransomware Attack" and the coverage type is "Cyber Extortion." An exemplary cyber risk infograph for this example is depicted and described with respect to FIG. 4.

FIG. 4 depicts an embodiment of a cyber security infograph 400 configured to capture relationships between the key metrics, features, and controls that inform the Ransomware Attack trigger associated with the Cyber Extortion coverage type. In this example, referencing the cyber risk infograph 400 identifies key metrics that inform key entities having an impact on the Ransomware Attack trigger.

Specifically, as shown in FIG. 4, key entities that inform the Ransomware Attack trigger represented by the trigger node at 410 include the control represented by the control node at 420 "Network Access," which is a category that is instructive for IT purposes, and the features represented by feature nodes "DNS" at 430, "IPAM" (i.e., IP address management and security) at 431, "Firewall" at 432, and "Content Filtering" at 433 (see, e.g. Table 1 for a mapping of features to controls). In this example, the two features represented by feature nodes "DNS" and "IPAM" are logically grouped together to form a vignette, represented by the vignette node "DNS and IP address management and security" at 440, which also informs other triggers represented by the trigger nodes "Business Interruption—First Party" at 411 and "Data/Privacy Breach Event—First and Third Party" at 412. Examples of metrics (not shown in the cyber security infograph 400 of FIG. 4) that inform the features "DNS" and "IPAM," and the vignette "DNS and IP address management and security" are provided in Table 2 below.

TABLE 2

Metrics that Inform DNS and IP address management and security

Metric

DNS A record is retrieved successfully
Whois returns results for the domains scanned
Number of days since domain creation
Number of days since domain update
Domains are not expired
DNS CAA record is being used
DNS CAA record is being used for all domains
Domain registration prohibits client update
Domain registration prohibits client transfer
Domain registration prohibits client deletion
Number of DNS NS records
Number of DNS MX records In some embodiments, as mentioned previously, the cyber resilience platform (e.g., cyber resilience platform 100 or cyber resilience platform 200) comprises an aggregator configured to map one or more metrics to an observation that provides an aggregated description to a user. For example, an aggregator is configured to determine a derived value or a summary statistic (e.g., average, median value, minimum value, maximum value, total count, etc.) based at least in part on one or more metrics depending on the application. In these cases, the cyber resilience platform is configured to generate an observation node associated with the observation corresponding to the aggregated description. In some cases, the observation is the same as the metric (i.e., no aggregation is performed). In other cases, a model (e.g., a predictive model) is used to generate the observation based at least in part on one or more metrics.

FIG. 3B illustrates an exemplary embodiment of a cyber security infograph 301 that includes an observation node associated with an observation derived or determined based at least in part on one or more metrics. As depicted in FIG. 3B, cyber security infograph 301 comprises a plurality of nodes and edges, wherein an edge connecting one node to another node in the plurality of nodes represents a relationship between the two nodes connected by the edge. In the example shown, an observation is represented in the cyber security infograph by an observation node (e.g., Observation 1 at 335). In this case, a first observation associated with or represented by Observation 1 at 335 is informed by a first metric represented in the cyber security infograph by Metric 1 at 310 as indicated by an edge at 313 between Metric 1 at 310 and Observation 1 at 335. Additionally, the first observation is informed by a second metric represented in the cyber security infograph by Metric 2 at 320 as indicated by an edge at 323 between Metric 2 at 320 and Observation 1 at 335. As shown in FIG. 3B, a relationship also exists between the first observation and a first feature represented by or associated with Feature 1 at 340 as indicated by an edge at 336 between Observation 1 at 335 and Feature 1 at 340.

The cyber security infograph provides a flexible framework that can be changed or adjusted as needed depending on the application to add or remove nodes representing entities or edges between nodes if relationships between nodes should change. The addition of nodes to the cyber security infograph will now be described with respect to the following figure.

Figure 3C:
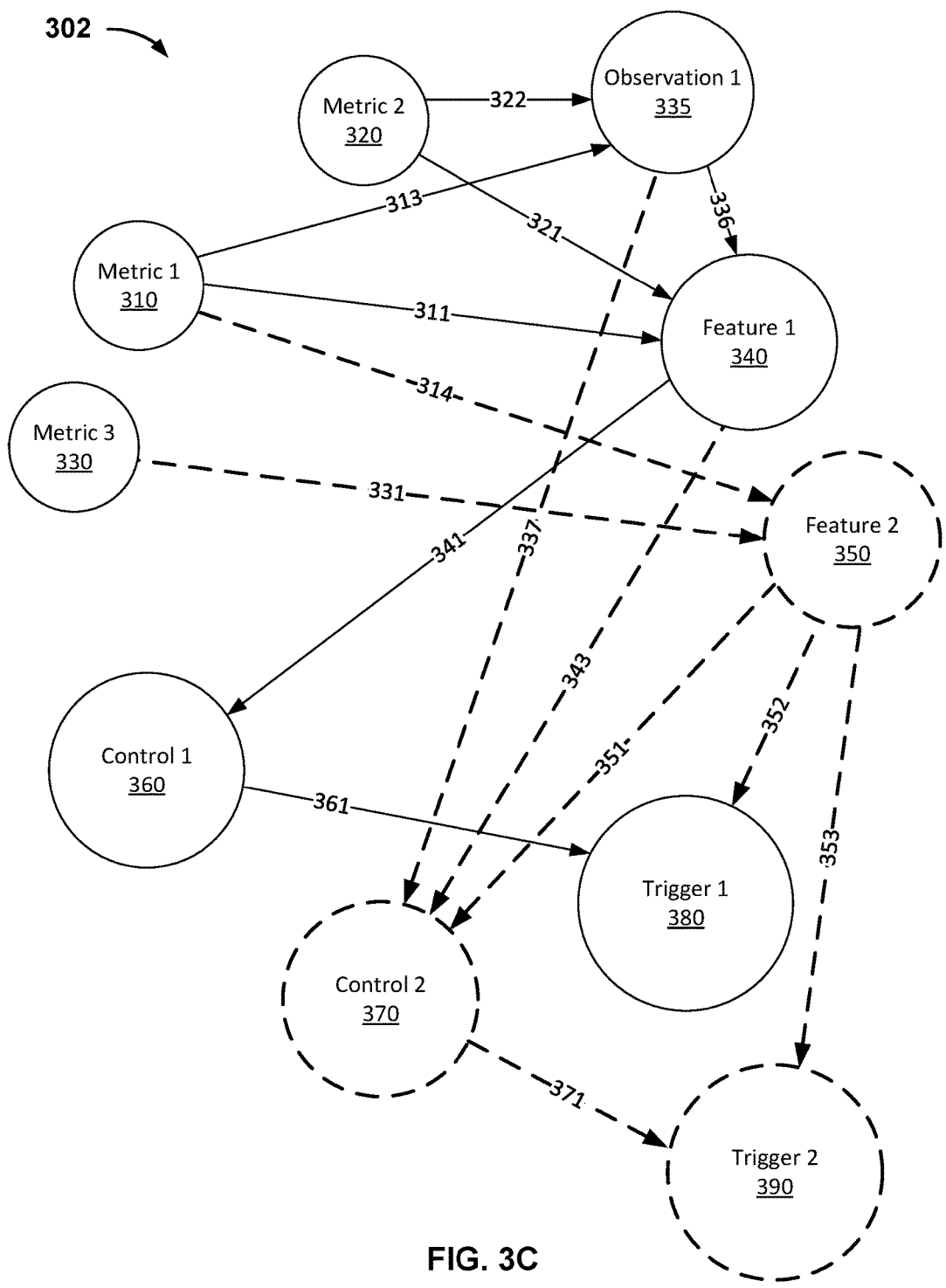
FIG. 3C illustrates an exemplary embodiment of a cyber security infograph that depicts the addition of nodes to the cyber security infograph of FIG. 3B.

FIG. 3C illustrates an exemplary embodiment of a cyber security infograph 302 that depicts the addition of nodes to the cyber security infograph 301 of FIG. 3B. As shown in FIG. 3C, a second feature node (e.g., Feature 2 at 350) associated with a second feature is added to the cyber security infograph 302. In this case, the second feature associated with or represented by Feature 2 at 350 is informed by a first metric represented in the cyber security infograph by Metric 1 at 310 as indicated by an edge at 314 between Metric 1 at 310 and Feature 2 at 350. Additionally, the second feature associated with or represented by Feature 2 at 350 is informed by a third metric represented in the cyber security infograph by Metric 3 at 330 as indicated by an edge at 331 between Metric 3 at 330 and Feature 2 at 350. Note that in this case, before the addition of the second feature node (e.g., Feature 2 at 350) associated with the second feature, the third metric represented by Metric 3 at 330 did not have any edges connecting it to any other nodes in the cyber security infograph. Here, the edge at 331 connecting Metric 3 at 330 to Feature 2 at 350 represents a mapping of the third metric to the second feature. In other words, the third metric informs the second feature. Thus, as shown in FIG. 3C, cyber security infograph 302 captures the relationship between various key entities—here, that the second feature (represented by Feature 2 at 350) is informed by the first and third metrics (represented by Metric 1 at 310 and Metric 3 at 330 respectively).

FIG. 3C also depicts a second control node (e.g., Control 2 at 370) associated with a second control that is added to the cyber security infograph 302. Here, the second control associated with or represented by Control 2 at 370 is informed by a first observation represented in the cyber security infograph by Observation 1 at 335 as indicated by an edge at 337 between Observation 1 at 335 and Control 2 at 370. Additionally, the second control associated with or represented by Control 2 at 370 is informed by a first feature represented in the cyber security infograph by Feature 1 at 340 as indicated by an edge at 343 between Feature 1 at 340 and Control 2 at 370. Finally, the second control associated with or represented by Control 2 at 370 is informed by a second feature represented in the cyber security infograph by Feature 2 at 350 as indicated by an edge at 351 between Feature 2 at 350 and Control 2 at 370. Thus, as shown in FIG. 3C, cyber security infograph 302 captures the relationship between various key entities—here, that the second control (represented by Control 2 at 370) is informed by the first observation (represented by Observation 1 at 335), and by the first and second features (represented by Feature 1 at 340 and Feature 2 at 350 respectively).

Also depicted in FIG. 3C is a second trigger node (e.g., Trigger 2 at 390) associated with a second trigger that is added to the cyber security infograph 302. In the example shown, the second trigger associated with or represented by Trigger 2 at 390 is informed by a second feature represented in the cyber security infograph by Feature 2 at 350 as indicated by an edge at 353 between Feature 2 at 350 and Trigger 2 at 390. Additionally, the second trigger associated with or represented by Trigger 2 at 390 is informed by a second control associated with or represented by Control 2 at 370 as indicated by an edge at 371 between Control 2 at 370 and Trigger 2 at 390. Thus, as shown in FIG. 3C, cyber security infograph 302 captures the relationship between various key entities—here, that the second trigger (represented by Trigger 2 at 390) is informed by the second feature (represented by Feature 2 at 350) and the second control (represented by Control 2 at 370).

Embodiments of the disclosed method for identifying and quantifying a cyber security risk that can be performed by the cyber resilience platform as described above with respect to FIGS. 1 and 2 are described with respect to the following figures. In particular, these embodiments provide better visibility with respect to the changing cyberspace landscape by providing a method to identify and assess key factors and parameters such as metrics and observations that impact types of cyber security risk. These key factors can be used to distinguish between users of different risk types (e.g., high risk versus low risk users) for different cyber threats. The disclosed method provides an ability to determine actions for an insurance customer that can raise or mitigate that customer's cyber security risk (as indicated by a cyber security score) and that impact the decision regarding an appropriate coverage for the customer against a given cyber security risk posed by a cyber threat.

Figure 5:
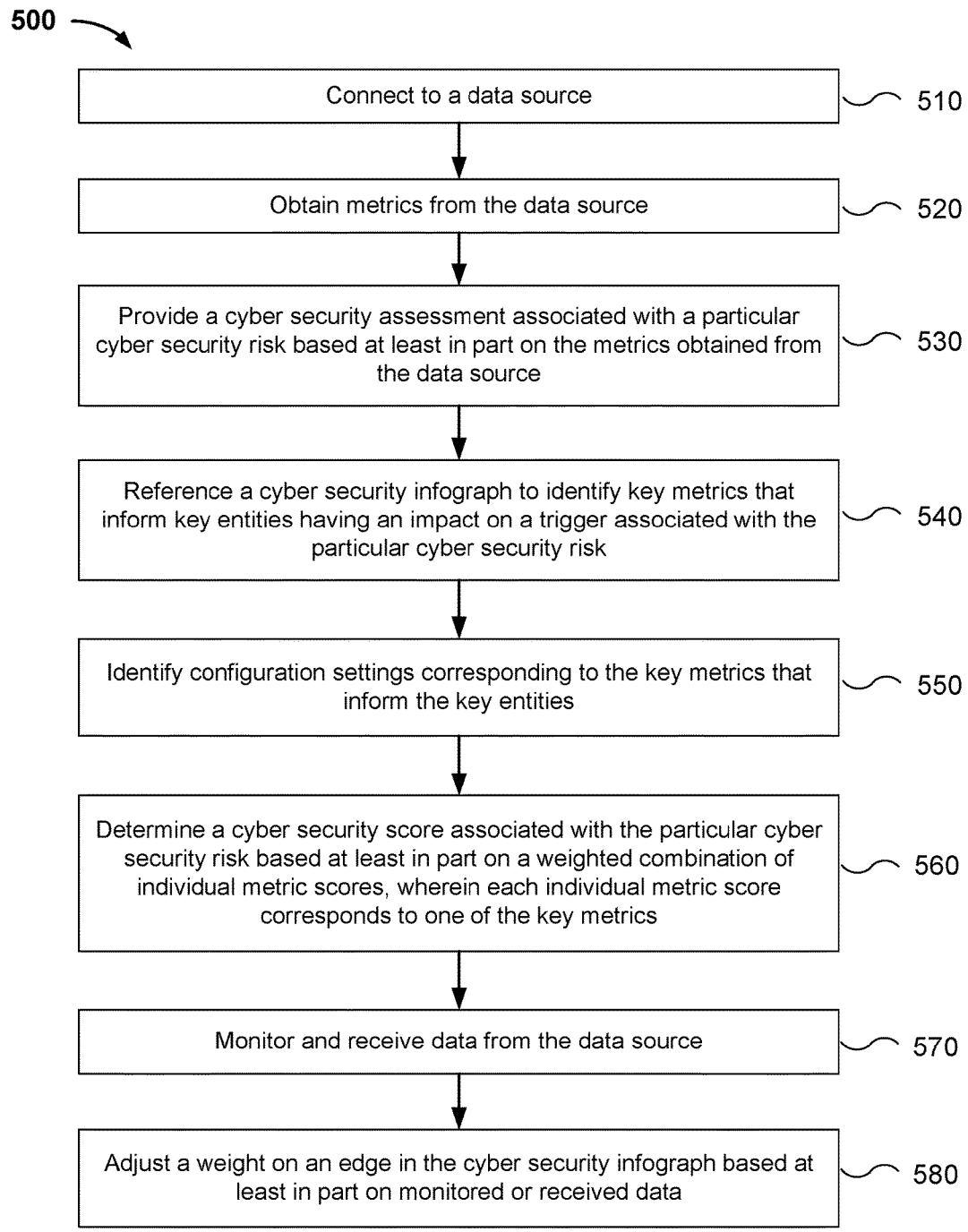
FIG. 5 illustrates an exemplary embodiment of a method for assessing and quantifying a cyber security risk.

FIG. 5 illustrates an exemplary embodiment of a method 500 for assessing and quantifying a cyber security risk that can be performed by the cyber resilience platform (e.g., cyber resilience platform 100 of FIG. 1 or cyber resilience platform 200 of FIG. 2).

As shown in FIG. 5, method 500 includes connecting to a data source at 510 and obtaining metrics from the data source at 520. In some cases, the metrics are pulled or obtained via a source connector (e.g., Source Connector 110) from a data source (e.g., Data Source 101). In some instances, the metrics are processed by a processor (e.g., Processor 120) including for example, a metric processor configured to normalize a metric pulled from the data source and to determine a benchmark for the normalized metric. In some examples, the data source comprises a plurality of data sources (e.g. Data Source 201, Data Source 202, and Data Source 203) and metrics are pulled or obtained from each of the plurality of data sources by a plurality of source connectors (e.g., Source Connector 211, Source Connector 212, and Source Connector 213) configured to connect to each data source (e.g. Data Source 201, Data Source 202, and Data Source 203) in the plurality of data sources and to pull metrics from each of the data sources. In some cases, a single source connector is configured to connect to and pull data from multiple data sources. In some instances, each of a plurality of processors (including metric processors) is configured to process metrics pulled from the plurality of data sources. Additionally, as shown in and as discussed with respect to FIGS. 3A-3C, each metric is represented in the cyber security infograph by a metric node associated with the metric.

At 530, method 500 includes providing a cyber security assessment associated with a particular cyber security risk based at least in part on the metrics obtained from the data source. In some cases, the cyber security assessment is provided by a cyber security assessor (e.g., Cyber Security Assessor 141 or Cyber Security Assessor 241). The cyber security assessment provides better visibility with respect to the changing cyberspace landscape by identifying and assessing key factors and parameters such as metrics and observations that impact types of cyber security risk. These key factors are used to identify and recommend actions that affect loss probabilities associated with a cyber threat. In this manner, the disclosed method can be used to identify strengths and weaknesses in an insurance customer's cyber security profile, including specific configuration settings (e.g., IT configuration settings or other settings related to a cyber security system) that impact the effectiveness of the insurance customer's cyber security system or measures. As a result, the disclosed method provides an ability to determine actions for a customer that can raise or mitigate that insurance customer's cyber security risk and that impact the decision regarding an appropriate coverage for the insurance customer against a given cyber security risk posed by a cyber threat.

In the example shown, providing a cyber security assessment includes referencing a cyber security infograph at 540 to identify key metrics that inform key entities having an impact on a trigger associated with the particular cyber security risk. In this case, the cyber security infograph (e.g., cyber security infograph 300) comprises a plurality of nodes and edges, wherein each node represents an entity in a data ontology and an edge connecting one node to another node in the plurality of nodes represents a relationship between the two entities corresponding to the nodes connected by the edge. Here, the entities in the data ontology include metrics, observations, features, controls, and triggers, each trigger being associated with a cyber security risk. In some cases, as described herein, the entities in the data ontology also include vignettes.

In some cases, the impact of one entity on another second entity, wherein each entity is represented by a node in the cyber security infograph, is indicated by a weight on an edge connecting the nodes of the two entities in the cyber security infograph. In some embodiments, providing a cyber security assessment includes referencing a cyber security infograph to identify key metrics that inform key entities having a substantial impact on a trigger associated with the particular cyber security risk. In some cases, an impact of one entity on another entity is determined to be substantial if the weight on the edge is above a certain threshold, which is set depending on the application. For example, in some applications, threshold values include 10%, 20%, 30%, 40%, and 50%, wherein a weight that is equal to or above the threshold value is considered to indicate a substantial impact, and the weight on an edge in this case ranges between 0 and 100%. In other cases, the key entities having a substantial impact on a trigger are identified based on selecting a certain number of entities having the greatest impact (as indicated by the weights on their respective edges linking the nodes of each entity to the trigger node).

In this example, providing a cyber security assessment also includes, at 550, identifying configuration settings corresponding to the key metrics that inform the key entities. In some cases, the cyber security assessment identifies increased types of cyber risk and coverage types to consider as well as weaknesses in a customer's cyber security profile in specific areas (e.g., configuration settings defined by certain metrics that inform a feature or a control having an impact on a trigger associated with a particular cyber security risk).

At 560, method 500 includes determining a cyber security score associated with the particular cyber security risk based at least in part on a weighted combination of individual metric scores, wherein each individual metric score corresponds to one of the key metrics. In some cases, the cyber security score is determined by a cyber security analyzer (e.g., Cyber Security Analyzer 142 or Cyber Security Analyzer 242).

Finally, method 500 includes monitoring and receiving data from the data source at 570 and adjusting a weight on an edge in the cyber security infograph based at least in part on the monitored or received data at 580.

In some embodiments, the data is monitored and received and the weight is adjusted by a cyber security monitor (e.g., Cyber Security Monitor 143 or Cyber Security Monitor 243). In some instances, the data is received by the cyber security monitor on a regular, ongoing, or continual basis, depending on how often the data is updated or available from the data source. For example, depending on the application or the data source, data is available or updated on a daily or hourly basis. In some cases, data is available or updated every minute or every second. In these cases, where the availability or updating of data is at a high sampling rate, the data is essentially pulled and processed in real time and the weight is adjusted on an edge in the cyber security infograph on an ongoing, continual, or real-time basis based at least in part on or in response to the received data. In the case where the data is available or updated in real time, the data is monitored and received by the cyber security monitor in real time and the cyber security monitor is configured to adjust the weight on an edge in the cyber security infograph in real time.

Figure 6:
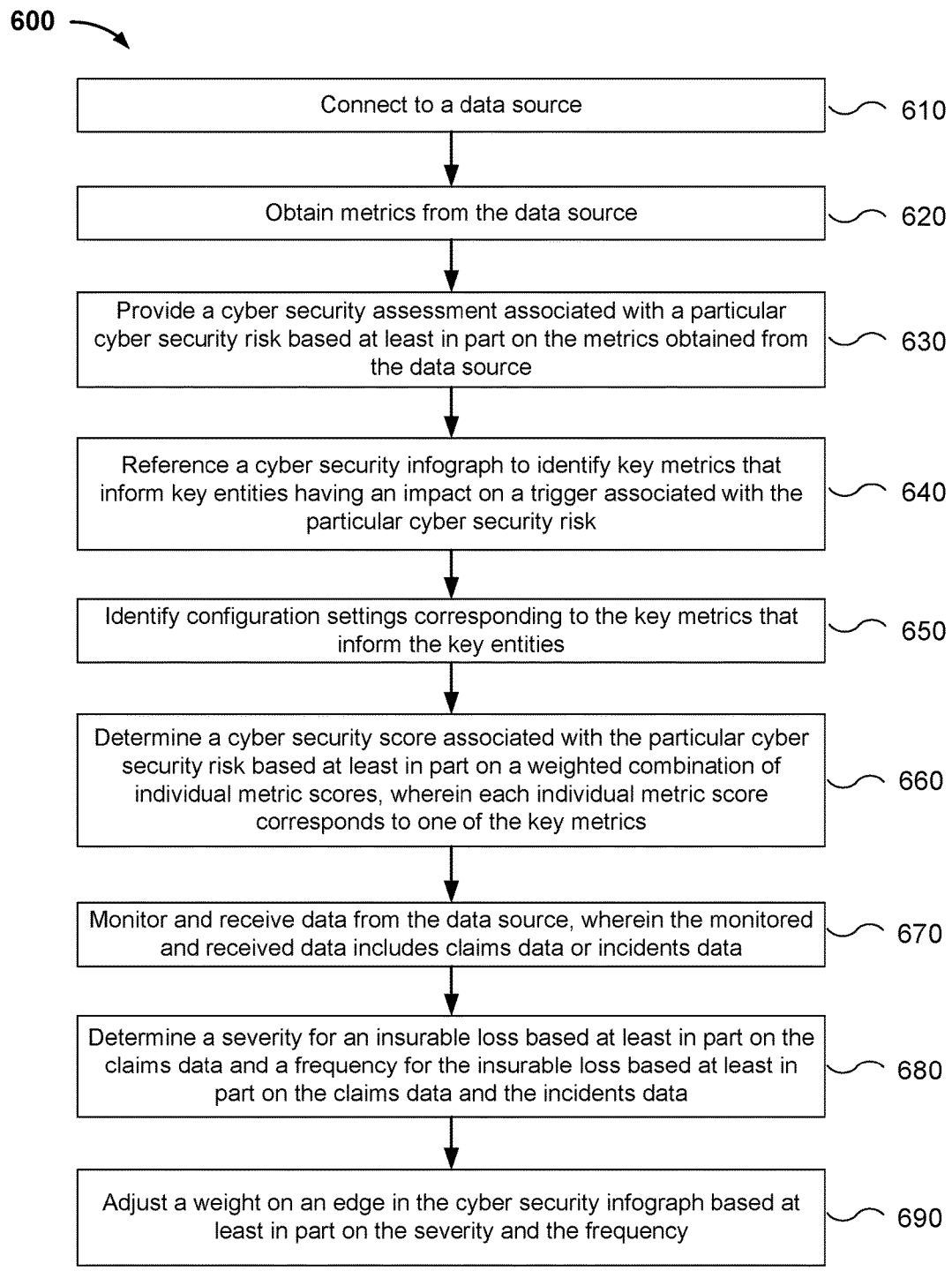
FIG. 6 illustrates an exemplary embodiment of a method for assessing and quantifying a cyber security risk that includes determining a severity and a frequency for an insurable loss.

FIG. 6 illustrates an exemplary embodiment of a method 600 for assessing and quantifying a cyber security risk that includes determining a severity and a frequency for an insurable loss. In this case, severity is a measure of an actual loss resulting as a consequence of a breach due to a loss event occurring, while frequency is a measure of how often the loss event occurs.

As shown in FIG. 6, method 600 includes connecting to a data source at 610 and obtaining metrics from the data source at 620. A cyber security assessment associated with a particular cyber security risk based at least in part on the metrics obtained from the data source is provided at 630. In the example shown, providing a cyber security assessment includes referencing a cyber security infograph at 640 to identify key metrics that inform key entities having an impact on a trigger associated with the particular cyber security risk. In this case, the cyber security infograph (e.g., cyber security infograph 300) comprises a plurality of nodes and edges, wherein each node represents an entity in a data ontology and an edge connecting one node to another node in the plurality of nodes represents a relationship between the two entities corresponding to the nodes connected by the edge. Here, the entities in the data ontology include metrics, observations, features, controls, and triggers, each trigger being associated with a cyber security risk. In some cases, as described herein, the entities in the data ontology also include vignettes.

In some cases, the impact of one entity on another second entity, wherein each entity is represented by a node in the cyber security infograph, is indicated by a weight on an edge connecting the nodes of the two entities in the cyber security infograph. In some embodiments, providing a cyber security assessment includes referencing a cyber security infograph to identify key metrics that inform key entities having a substantial impact on a trigger associated with the particular cyber security risk. In some cases, an impact of one entity on another entity is determined to be substantial if the weight on the edge is above a certain threshold, which is set depending on the application. For example, in some applications, threshold values include 10%, 20%, 30%, 40%, and 50%, wherein a weight that is equal to or above the threshold value is considered to indicate a substantial impact, and the weight on an edge in this case ranges between 0 and 100%. In other cases, the key entities having a substantial impact on a trigger are identified based on selecting a certain number of entities having the greatest impact (as indicated by the weights on their respective edges linking the nodes of each entity to the trigger node).

In this example, providing a cyber security assessment also includes, at 650, identifying configuration settings corresponding to the key metrics that inform the key entities. In some cases, the cyber security assessment identifies increased types of cyber risk and coverage types to consider as well as weaknesses in a customer's cyber security profile in specific areas (e.g., configuration settings defined by certain metrics that inform a feature or a control having an impact on a trigger associated with a particular cyber security risk).

The disclosed method as embodied in method 600 includes determining a cyber security score associated with the particular cyber security risk based at least in part on a weighted combination of individual metric scores at 660, wherein each individual metric score corresponds to one of the key metrics.

As shown in FIG. 6, the disclosed method 600 also includes monitoring and receiving data from the data source at 670, wherein the monitored and received data includes claims data or incidents data.

At 680, the disclosed method 600 includes determining a severity for an insurable loss based at least in part on the claims data and a frequency for the insurable loss based at least in part on the claims data and the incidents data.

At 690, method 600 includes adjusting a weight on an edge in the cyber security infograph based at least in part on the severity and the frequency.

In some embodiments, the data source comprises a plurality of data sources (e.g. Data Source 201, Data Source 202, and Data Source 203) and monitoring and receiving data from the data source comprises monitoring and receiving data from one or more data sources in the plurality of data sources. In some cases, the data that is monitored and received from at least one of the data sources in the plurality of data sources includes security data, such as claims data or incidents data.

In some cases, a severity for the insurable loss based at least in part on the claims data or a frequency for the insurable loss based at least in part on the claims data and the incidents data is determined by a cyber security assessor (e.g., Cyber Security Assessor 141 or Cyber Security Assessor 241). Moreover, in some instances, the data is monitored and received and the weight is adjusted by a cyber security monitor (e.g., Cyber Security Monitor 143 or Cyber Security Monitor 243). In some instances, the data is received by the cyber security monitor on a regular, ongoing, or continual basis, depending on how often the data is updated or available from the data source. For example, depending on the application or the data source, data is available or updated on a daily or hourly basis. In some cases, data is available or updated every minute or every second. In these cases, where the availability or updating of data is at a high sampling rate, the data is essentially pulled and processed in real time. Accordingly, the severity or the frequency for the insurable loss is determined or updated on an ongoing, continual, or real-time basis based at least in part on or in response to the received data. Similarly, the weight is adjusted on an edge in the cyber security infograph on an ongoing, continual, or real-time basis based at least in part on or in response to the received data. In the case where the data is available or updated in real time, the data is monitored and received by the cyber security monitor in real time. In this case, the cyber security assessor is configured to determine or to update a severity or a frequency in real time and the cyber security monitor is configured to adjust a weight on an edge in the cyber security infograph in real time.

In some embodiments, the disclosed method further comprises processing one or more metrics pulled or obtained from the data source. In some examples, processing a metric includes normalizing the metric. Some embodiments also include determining a benchmark for a normalized metric. In some examples, determining the cyber security score is based at least in part on the benchmark.

In some instances, determining a benchmark for a key metric is based at least in part on a baseline model. In some cases, the baseline model is established by an industry standard. In other cases, the baseline model comprises a predictive model. In some examples, the benchmark is initially set based at least in part on an industry standard and is subsequently adjusted based on an output of a predictive model. The predictive model is a machine learning model in some cases, which can be trained using data (e.g., security data pulled and processed from various data sources). In some cases, the security data includes data associated with claims or incidences.

In some embodiments, the disclosed method further comprises identifying one or more actionable items to improve the cyber security score. For example, actionable items include identified configurations or configuration settings defined by key metrics that inform features or controls that in turn inform a trigger associated with a particular cyber security risk.

In summary, the cyber resilience platform as described herein provides a technical solution to a technical problem of identifying key factors that impact loss events associated with various types of cyber security risk from vast amounts of raw data collected from a dynamic and constantly changing cyber space environment. In particular, through the use of a cyber security infograph, the cyber resilience platform provides visibility to a cyber risk landscape where loss events span a large set of nodes and are correlated. Moreover, the disclosed technique provides an ability to overcome problems due to the interdependent and correlated nature of cyber security risks particular to the cyber insurance industry by providing a method and system that provides sound actuarial data relating to actual damage correlated with a cyber risk event. The cyber resilience platform also provides a set of standards associated with the classification of cyber risk events in a framework that incorporates industry best practices while adapting to the changing cyber security risk landscape to provide improved predictions of the threats that most impact a customer's cyber security profile.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for assessing and quantifying a cyber security risk, the system comprising:
   a processor; and
   a memory coupled with the processor, wherein the memory is configured to provide the processor with instructions which when executed cause the processor to:
   connect to a data source and obtain metrics from the data source;
   provide a cyber security assessment associated with a particular cyber security risk based at least in part on the metrics obtained from the data source, including by:
      referencing a cyber security infograph to identify key metrics that inform key entities having an impact on a trigger associated with the particular cyber security risk, the cyber security infograph comprising a plurality of nodes and edges, wherein each node represents an entity in a data ontology and an edge connecting one node to another node in the plurality of nodes represents a relationship between the two entities corresponding to the nodes connected by the edge, and wherein the entities in the data ontology include metrics, observations, features, controls, and triggers, each trigger being associated with a cyber security risk; and
      identifying configuration settings corresponding to the key metrics that inform the key entities;
   determine a cyber security score associated with the particular cyber security risk based at least in part on a weighted combination of individual metric scores corresponding to the key metrics;
   monitor and receive data from the data source; and
   adjust a weight on an edge in the cyber security infograph based at least in part on the monitored or received data.

2. The system of claim 1, wherein the data source comprises a plurality of data sources.

3. The system of claim 1, wherein the monitored and received data includes claims data or incidents data and wherein the processor is further configured to:
   determine a severity for an insurable loss based at least in part on the claims data and a frequency for the insurable loss based at least in part on the claims data and the incidents data; and
   adjust the weight on the edge in the cyber security infograph based at least in part on the severity and the frequency.

4. The system of claim 1, wherein the processor is further configured to normalize a metric obtained from the data source and determine a benchmark for the normalized metric, wherein the cyber security score is based at least in part on the benchmark.

5. The system of claim 1, wherein the processor is further configured to determine a benchmark for a key metric based at least in part on a baseline model, wherein the cyber security score is based at least in part on the benchmark.

6. The system of claim 1, wherein the processor is further configured to determine a benchmark for a key metric based at least in part on a baseline model, wherein the baseline model is based at least in part on an industry standard and wherein the cyber security score is based at least in part on the benchmark.

7. The system of claim 1, wherein the processor is further configured to determine a benchmark for a key metric based at least in part on a baseline model, wherein the baseline model comprises a predictive model and wherein the cyber security score is based at least in part on the benchmark.

8. The system of claim 1, wherein the processor is further configured to map one or more metrics to an observation that provides an aggregated description to a user.

9. The system of claim 1, wherein the processor is further configured to identify one or more actionable items to improve a security cyber security score.

10. The system of claim 1, wherein the data is monitored and received by the cyber security monitor on a continual basis and wherein the cyber security monitor is configured to adjust the weight on a continual basis.

11. A method for assessing and quantifying a cyber security risk, the method comprising:
    connecting to a data source and obtaining metrics from the data source;
    providing a cyber security assessment associated with a particular cyber security risk based at least in part on the metrics obtained from the data source, including by:
       referencing a cyber security infograph to identify key metrics that inform key entities having an impact on a trigger associated with the particular cyber security risk, the cyber security infograph comprising a plurality of nodes and edges, wherein each node represents an entity in a data ontology and an edge connecting one node to another node in the plurality of nodes represents a relationship between the two entities corresponding to the nodes connected by the edge, and wherein the entities in the data ontology include metrics, observations, features, controls, and triggers, each trigger being associated with a cyber security risk; and
       identifying configuration settings corresponding to the key metrics that inform the key entities;
    determining a cyber security score associated with the particular cyber security risk based at least in part on a weighted combination of individual metric scores, wherein each individual metric score corresponds to one of the key metrics;
    monitoring and receiving data from the data source; and
    adjusting a weight on an edge in the cyber security infograph based at least in part on the monitored or received data.

12. The method of claim 11, wherein the data source comprises a plurality of data sources.

13. The method of claim 11, wherein the monitored and received data includes claims data and incidents data, the method further comprising:
    determining a severity for an insurable loss based at least in part on the claims data and a frequency for the insurable loss based at least in part on the claims data and the incidents data; and
    adjusting the weight on the edge in the cyber security infograph based at least in part on the severity and the frequency.

14. The method of claim 11, further comprising normalizing a metric obtained from the data source and determining a benchmark for the normalized metric, wherein determining the cyber security score is based at least in part on the benchmark.

15. The method of claim 11, further comprising determining a benchmark for a key metric based at least in part on a baseline model.

16. The method of claim 11, further comprising determining a benchmark for a key metric based at least in part on a baseline model, wherein the baseline model is established by an industry standard.

17. The method of claim 11, further comprising determining a benchmark for a key metric based at least in part on a baseline model, wherein the baseline model comprises a predictive model.

18. The method of claim 11, further comprising identifying one or more actionable items to improve the cyber security score.

19. The method of claim 11, wherein the data is monitored and received by the cyber security monitor on a continual basis and wherein the cyber security monitor is configured to adjust the weight on a continual basis.

20. A computer program product for assessing and quantifying a cyber security risk, the computer program product being embodied in a tangible non-transitory computer readable storage medium and comprising computer instructions for:
connecting to a data source and obtaining metrics from the data source;
providing a cyber security assessment associated with a particular cyber security risk based at least in part on the metrics obtained from the data source, including by:
referencing a cyber security infograph to identify key metrics that inform key entities having an impact on a trigger associated with the particular cyber security risk, the cyber security infograph comprising a plurality of nodes and edges, wherein each node represents an entity in a data ontology and an edge connecting one node to another node in the plurality of nodes represents a relationship between the two entities corresponding to the nodes connected by the edge, and wherein the entities in the data ontology include metrics, observations, features, controls, and triggers, each trigger being associated with a cyber security risk; and
identifying configuration settings corresponding to the key metrics that inform the key entities;
determining a cyber security score associated with the particular cyber security risk based at least in part on a weighted combination of individual metric scores, wherein each individual metric score corresponds to one of the key metrics;
monitoring and receiving data from the data source; and
adjusting a weight on an edge in the cyber security infograph based at least in part on the monitored or received data.

* * * * *